United States Patent
LiVoti et al.

(10) Patent No.: US 12,301,932 B2
(45) Date of Patent: *May 13, 2025

(54) METHODS AND APPARATUS TO DETERMINE AN AUDIENCE COMPOSITION BASED ON VOICE RECOGNITION

(71) Applicant: The Nielsen Company (US), LLC, New York, NY (US)

(72) Inventors: John T. LiVoti, Clearwater, FL (US); Stanley Wellington Woodruff, Palm Harbor, FL (US); Rajakumar Madhanganesh, Tampa, FL (US); Khushboo Agarwal, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,379

(22) Filed: Jan. 13, 2023

(65) Prior Publication Data

US 2023/0232071 A1 Jul. 20, 2023

Related U.S. Application Data

(63) Continuation of application No. 16/998,811, filed on Aug. 20, 2020, now Pat. No. 11,595,723.

(51) Int. Cl.
*H04N 21/442* (2011.01)
*G10L 15/20* (2006.01)
(Continued)

(52) U.S. Cl.
CPC ....... *H04N 21/44218* (2013.01); *G10L 15/20* (2013.01); *G10L 15/32* (2013.01); *H04N 21/42203* (2013.01)

(58) Field of Classification Search
None
See application file for complete search history.

(56) References Cited

U.S. PATENT DOCUMENTS

| 4,769,697 A | 9/1988 | Gilley et al. |
| 5,995,206 A | 11/1999 | Morinaka et al. |
| (Continued) | | |

FOREIGN PATENT DOCUMENTS

| EP | 358911 A2 | 3/1990 |
| JP | 3328500 B2 | 9/2002 |
| NZ | 530015 A | 8/2005 |

OTHER PUBLICATIONS

"What's The Difference between Thermal Imaging and Night Vision," Flir.com, retrieved from https://www.flir.com/discover/ots/thermal-vs-night-vision/ on May 21, 2019, (7 pages).

(Continued)

*Primary Examiner* — Alexander Q Huerta

(57) ABSTRACT

Methods, apparatus, systems and articles of manufacture are disclosed. An example apparatus includes a controller to cause a people meter to emit a prompt for input of audience identification information at a first time and determine a first audience count based on the input, an audio detector to determine a second audience count based on signatures generated from audio data captured in the media environment, and a comparator to cause the people meter to not emit the prompt for at least a first time period after the first time when the first audience count is equal to the second audience count.

20 Claims, 9 Drawing Sheets

(51) Int. Cl.
    *G10L 15/32*    (2013.01)
    *H04N 21/422*   (2011.01)

(56) References Cited

U.S. PATENT DOCUMENTS

| | | | |
|---|---|---|---|
| 6,029,124 | A | 2/2000 | Gillick et al. |
| 7,155,159 | B1 | 12/2006 | Weinblatt et al. |
| 7,609,853 | B2 | 10/2009 | Ramaswamy et al. |
| 7,752,042 | B2 | 7/2010 | Srinivasan |
| 7,839,291 | B1 | 11/2010 | Richards |
| 7,985,953 | B2 | 7/2011 | Luterotti et al. |
| 8,091,100 | B2 | 1/2012 | Donato |
| 8,571,865 | B1 | 10/2013 | Hewinson |
| 8,849,199 | B2 | 9/2014 | Shrum, Jr. et al. |
| 9,100,132 | B2 | 8/2015 | Kolessar et al. |
| 9,100,685 | B2 | 8/2015 | Conrad et al. |
| 9,183,849 | B2 | 11/2015 | Neuhauser et al. |
| 9,219,559 | B2 | 12/2015 | McMillan |
| 9,363,155 | B1 | 6/2016 | Gravino et al. |
| 9,489,640 | B2 | 11/2016 | Neuhauser et al. |
| 9,503,536 | B2 | 11/2016 | Bosworth et al. |
| 9,628,844 | B2 | 4/2017 | Conrad et al. |
| 9,667,920 | B2 | 5/2017 | Deng |
| 9,711,034 | B2 | 7/2017 | Daniel |
| 9,918,127 | B2 | 3/2018 | Hicks |
| 10,032,451 | B1 | 7/2018 | Mamkina et al. |
| 10,657,383 | B1 | 5/2020 | Solh et al. |
| 10,860,645 | B2 | 12/2020 | Oh |
| 11,151,858 | B2 | 10/2021 | Modiano |
| 11,176,940 | B1 | 11/2021 | Zhong et al. |
| 11,373,425 | B2 | 6/2022 | Livoti et al. |
| 11,553,247 | B2 | 1/2023 | Woodruff et al. |
| 11,595,723 | B2 | 2/2023 | LiVoti et al. |
| 2002/0052746 | A1 | 5/2002 | Handelman |
| 2002/0198762 | A1 | 12/2002 | Donato |
| 2003/0046083 | A1* | 3/2003 | Devinney, Jr. .......... G06Q 20/00 704/273 |
| 2003/0229492 | A1* | 12/2003 | Nolan ..................... G10L 17/06 704/E17.007 |
| 2004/0059438 | A1 | 3/2004 | Sherlock |
| 2005/0044189 | A1 | 2/2005 | Ikezoye et al. |
| 2005/0144632 | A1* | 6/2005 | Mears .................... H04H 60/33 725/15 |
| 2005/0172319 | A1* | 8/2005 | Reichardt .............. H04N 21/47 725/86 |
| 2006/0062429 | A1 | 3/2006 | Ramaswamy et al. |
| 2007/0011040 | A1 | 1/2007 | Wright et al. |
| 2008/0010066 | A1* | 1/2008 | Broman ............... G06Q 20/382 704/E15.001 |
| 2009/0002144 | A1 | 1/2009 | Bernard et al. |
| 2009/0290756 | A1* | 11/2009 | Ramaswamy ... H04N 21/44222 382/103 |
| 2010/0162285 | A1 | 6/2010 | Cohen et al. |
| 2010/0195865 | A1 | 8/2010 | Luff |
| 2011/0004474 | A1 | 1/2011 | Bansal et al. |
| 2011/0215932 | A1 | 9/2011 | Daniel |
| 2011/0283316 | A1* | 11/2011 | Chen ..................... H04R 27/00 725/38 |
| 2012/0023976 | A1 | 2/2012 | Kim et al. |
| 2012/0191231 | A1 | 7/2012 | Wang |
| 2012/0323566 | A1* | 12/2012 | Johnston ............... G06Q 30/02 704/200 |
| 2013/0016203 | A1 | 1/2013 | Saylor et al. |
| 2013/0030809 | A1* | 1/2013 | Farrell .................... G07C 9/37 704/E17.004 |
| 2013/0132271 | A1 | 5/2013 | Daniel |
| 2013/0312019 | A1* | 11/2013 | McMillan ........ H04N 21/42203 725/14 |
| 2014/0056433 | A1 | 2/2014 | Emerson, III |
| 2014/0280127 | A1 | 9/2014 | Wang et al. |
| 2014/0309866 | A1 | 10/2014 | Ricci |
| 2015/0092019 | A1 | 4/2015 | Asano et al. |
| 2015/0189378 | A1* | 7/2015 | Soundararajan ............................ H04N 21/44231 725/12 |
| 2015/0334457 | A1 | 11/2015 | Chandel et al. |
| 2016/0065902 | A1* | 3/2016 | Deng ..................... H04H 60/31 348/77 |
| 2016/0162674 | A1 | 6/2016 | Friedman |
| 2016/0234034 | A1 | 8/2016 | Mahar et al. |
| 2016/0261911 | A1 | 9/2016 | Soundararajan et al. |
| 2016/0344856 | A1 | 11/2016 | Alameh et al. |
| 2017/0024591 | A1 | 1/2017 | Detter et al. |
| 2017/0078749 | A1 | 3/2017 | PangZe |
| 2017/0147885 | A1 | 5/2017 | Aggarwal et al. |
| 2017/0178681 | A1 | 6/2017 | Keal et al. |
| 2017/0201795 | A1 | 7/2017 | Hicks |
| 2018/0137740 | A1 | 5/2018 | Vitt et al. |
| 2018/0157902 | A1 | 6/2018 | Tu et al. |
| 2018/0242907 | A1 | 8/2018 | Bonomi |
| 2018/0286068 | A1 | 10/2018 | Matsubara et al. |
| 2018/0295420 | A1 | 10/2018 | Rumreich et al. |
| 2018/0365968 | A1 | 12/2018 | Vitt et al. |
| 2019/0098359 | A1 | 3/2019 | Hicks |
| 2019/0116272 | A1 | 4/2019 | Freeman |
| 2019/0130365 | A1 | 5/2019 | Pell et al. |
| 2019/0268575 | A1 | 8/2019 | Leow |
| 2019/0320214 | A1 | 10/2019 | Sullivan et al. |
| 2019/0332871 | A1 | 10/2019 | Sudarsan et al. |
| 2019/0377898 | A1 | 12/2019 | Dunjic et al. |
| 2019/0378519 | A1 | 12/2019 | Dunjic et al. |
| 2020/0067620 | A1 | 2/2020 | Carmichael |
| 2020/0112759 | A1 | 4/2020 | Alameh et al. |
| 2020/0193592 | A1 | 6/2020 | Arienzo et al. |
| 2020/0334472 | A1 | 10/2020 | Miyano |
| 2020/0349230 | A1 | 11/2020 | Yoshioka et al. |
| 2020/0411013 | A1* | 12/2020 | Horton ................ H04M 3/2281 |
| 2021/0042859 | A1 | 2/2021 | Iwai |
| 2021/0073528 | A1 | 3/2021 | Lagerman |
| 2021/0082127 | A1 | 3/2021 | Yano et al. |
| 2021/0082382 | A1 | 3/2021 | Pinhas |
| 2021/0216753 | A1 | 7/2021 | Gefen et al. |
| 2021/0374394 | A1 | 12/2021 | Livoti et al. |
| 2022/0058382 | A1 | 2/2022 | Livoti et al. |
| 2022/0060784 | A1 | 2/2022 | LiVoti et al. |
| 2022/0060785 | A1 | 2/2022 | Woodruff et al. |
| 2022/0327853 | A1 | 10/2022 | Livoti et al. |
| 2023/0134393 | A1 | 5/2023 | Woodruff et al. |

OTHER PUBLICATIONS

Cooper, "How secure is voice recognition technology?", [http://www.business.att.com], retrieved on Jul. 14, 2020, 5 pages.
Wikipedia, "Speaker Recognition," [https://en.wikipedia.org/wiki/Speaker_recognition], retrieved on Jul. 14, 2020, last edited on Feb. 21, 2020, 6 pages.
United States Patent and Trademark Office, "Non-final Office Action," mailed in connection with U.S. Appl. No. 16/998,817, filed Jul. 21, 2021, 6 pages.
United States Patent and Trademark Office, "Non-final Office Action," mailed in connection with U.S. Appl. No. 16/890,715, filed Feb. 22, 2021, 9 pages.
United States Patent and Trademark Office, "Final Office Action," mailed in connection with U.S. Appl. No. 16/890,715, filed Jul. 23, 2021, 11 pages.
United States Patent and Trademark Office, "Final Office Action," mailed in connection with U.S. Appl. No. 16/998,817, filed Nov. 5, 2021, 7 pages.
United States Patent and Trademark Office, "Non-Final Office Action," mailed in connection with U.S. Appl. No. 16/998,811, filed Dec. 22, 2021, 12 pages.
United States Patent and Trademark Office, "Notice of Allowance and Fee(s) Due," mailed in connection with U.S. Appl. No. 16/890,715, filed Feb. 4, 2022, 8 pages.
United States Patent and Trademark Office, "Non-Final Office Action," mailed in connection with U.S. Appl. No. 16/998,814, filed Mar. 15, 2022, 8 pages.
International Searching Authority, "Written Opinion of the International Searching Authority," issued in connection with PCT Application No. PCT/US2021/035449, issued on Oct. 5, 2021, 4 pages.
International Searching Authority, "International Search Report,"

(56) References Cited

OTHER PUBLICATIONS issued in connection with PCT Application No. PCT/US2021/035449, issued on Oct. 5, 2021, 4 pages.

United States Patent and Trademark Office, "Non Final Office Action," mailed in connection with U.S. Appl. No. 16/998,817, filed Mar. 24, 2022, 7 pages.

United States Patent and Trademark Office, "Notice of Allowance and Fee(s) Due," issued in connection with U.S. Appl. No. 16/890,715, mailed on May 23, 2022, 8 pages.

United States Patent and Trademark Office, "Corrected Notice of Allowability," issued in connection with U.S. Appl. No. 16/890,715, mailed on Jun. 2, 2022, 2 pages.

United States Patent and Trademark Office, "Final Office Action," issued in connection with U.S. Appl. No. 16/998,811, mailed on Jun. 1, 2022, 17 pages.

United States Patent and Trademark Office, "Final Office Action," mailed in connection with U.S. Appl. No. 16/998,814, filed Aug. 1, 2022, 11 pages.

United States Patent and Trademark Office, "Notice of Allowance and Fee(s) Due," issued in connection with U.S. Appl. No. 16/998,811, mailed on Aug. 16, 2022, 9 pages.

United States Patent and Trademark Office, "Notice of Allowance and Fee(s) Due," issued in connection with U.S. Appl. No. 16/998,817, filed Aug. 31, 2022, 8 pages.

United States Patent and Trademark Office, "Advisory Action," issued in connection with U.S. Appl. No. 16/998,814, filed Oct. 25, 2022, 2 pages.

United States Patent and Trademark Office, "Notice of Allowance and Fee(s) Due," issued in connection with U.S. Appl. No. 16/998,811, mailed on Nov. 22, 2022, 9 pages.

United States Patent and Trademark Office, "Non-Final Office Action," issued in connection with U.S. Appl. No. 16/998,814, filed Dec. 15, 2022, 5 pages.

United States Patent and Trademark Office, "Corrected Notice of Allowability," issued in connection with U.S. Appl. No. 16/998,817, mailed on Dec. 15, 2022, 3 pages.

United States Patent and Trademark Office, "Notice of Allowance and Fee(s) Due," issued in connection with U.S. Appl. No. 16/998,814, filed May 3, 2023, 7 pages.

United States Patent and Trademark Office, "Non-Final Office Action," issued in connection with U.S. Appl. No. 18/091,538, filed May 18, 2023, 7 pages.

\* cited by examiner

METHODS AND APPARATUS TO DETERMINE AN AUDIENCE COMPOSITION BASED ON VOICE RECOGNITION

CROSS REFERENCE TO RELATED APPLICATIONS

This patent arises from a continuation of U.S. patent application Ser. No. 16/998,811, now U.S. Pat. No. 11,595,723, which is titled "METHODS AND APPARATUS TO DETERMINE AN AUDIENCE COMPOSITION BASED ON VOICE RECOGNITION," and which was filed on Aug. 20, 2020. Priority to U.S. patent application Ser. No. 16/998,811 is claimed. U.S. patent application Ser. No. 16/998,811 is hereby incorporated herein by reference in its entirety.

FIELD OF THE DISCLOSURE

This disclosure relates generally to audience monitoring, and, more particularly, to methods and apparatus to determine an audience composition based on voice recognition.

BACKGROUND

Media monitoring companies, also referred to as audience measurement entities, monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

The figures are not to scale. In general, the same reference numbers will be used throughout the drawing(s) and accompanying written description to refer to the same or like parts.

Figure 1:
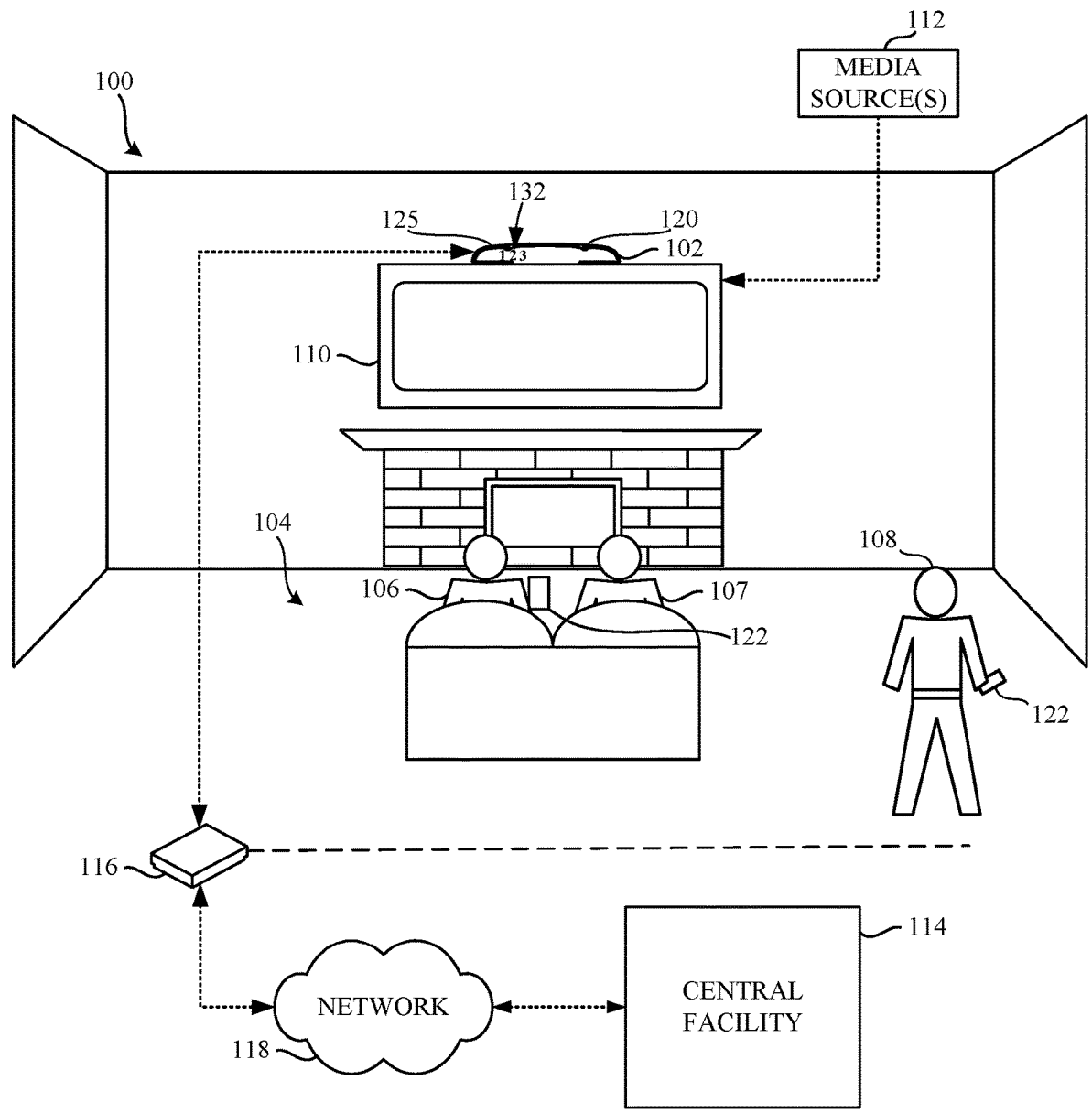
FIG. 1 illustrates an example audience measurement system having an example meter to monitor an example media presentation environment and generate exposure data for the media.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

At least some meters that perform media monitoring, such as the meters described above, implement media identification features and people identification features. Such features (e.g., media identification and people identification) enable the generation of media monitoring information that can be used for determining audience exposure (also referred to as user exposure) to advertisements, determining advertisement effectiveness, determining user behavior relative to media, identifying the purchasing behavior associated with various demographics, etc. The people identification features of the meter determine the audience in a media presentation environment. For example, the people identification feature may be implemented by active people meters, passive people meters, and/or a combination of active people meters and passive people meters to determine a people count.

An active people meter obtains a people count by actively prompting an audience to enter information for audience member identification. In some examples, an active people meter identifies an audience member by the audience member's assigned panelist number or visitor number. For example, the active people meter obtains the assigned panelist number or visitor number through a communication channel. In some examples, the active people meter pairs the information corresponding to the audience input with a household (e.g., a specific media environment) and with the corresponding demographic data for the people of that household. In some examples, the active people meter validates viewership (e.g., the number of audience members viewing media in the media environment) at a set interval. For example, the active people meter generates a prompting message for the audience members to verify that they are still in the audience. In this manner, the active people meter relies on audience compliance. In some examples, maintaining audience compliance is a challenge. For example, audience members may incorrectly enter the number of people viewing the media and/or they may miss the prompting messages generated by the active people meter.

A passive people meter obtains audience information passively, usually by capturing images of the audience using a camera and then employing facial recognition to identify the individual audience members included in the audience. In some examples, image processing for facial recognition can be processor intensive. Additionally, facial recognition algorithms can take a substantial amount of time to reliably recognize people in an image.

To enable an accurate and less invasive method of determining an audience composition, example methods and apparatus disclosed herein utilize a combination of a passive people meter and an active people meter. As used herein, "audience composition" refers to the number and/or identities of audience members in the audience. An example passive people meter disclosed herein includes an example audio detection system to identify audience members in the media environment. In some examples, the audio detection system includes an audio sensor to record the media environment and record samples of audio data. The example passive people meter utilizes the samples of audio data to detect and identify the audience members in the media environment.

Example methods and apparatus disclosed herein additionally utilize the active people meter to identify the audience members in the media environment. An example people meter, implemented by the example active people meter and the example passive people meter as disclosed herein, includes an example audience audio detector to identify audience members. In some examples, when the audience audio detector is unable to identify one or more audience members, the audience audio detector can notify the active people meter to generate a new prompting message for the audience member(s).

In some examples, the example people meter reduces (e.g., minimizes) the amount of prompting generated by the active people meter relative to prior people meters that do not employ a combination of active and passive people metering. For example, when the audience audio detector identifies the audience member(s), the audience composition is verified, and subsequent active prompting can be disabled for at least a given monitoring interval (e.g., 5 minutes, 15 minutes, etc.). Using audio sensing, the people meter monitors the media environment over time (e.g., continuously, at sampled time intervals, etc.) to determine the number of different speech patterns attributable to unique audience members, validate against the number entered on the active people meter and/or previously logged, and accurately determine the audience composition.

In some examples disclosed herein, the example people meter includes a people identification model controller to train a model to learn about the corresponding household media environment. As used herein, a model is a description of an environment using mathematical concepts and language. A model is generally composed of relationships and variables, the relationships describing operators (e.g., such as algebraic operators, functions, etc.) and the variables describing monitored environment parameters of interest that can be quantified. In some examples, the model is a machine learning and/or artificial intelligence (AI) model such as a Linear Regression model, a decision tree, a support vector machine (SVM) model, a Naïve Bayes model, etc.

In some examples, the people identification model controller obtains data from the comparator, the active people meter, and the passive people meter and generates a feature vector corresponding to the data. The example people identification model controller utilizes the feature vector to train the model. For example, the feature vector includes data representative of descriptive characteristics of a physical environment (e.g., the household media environment). In some examples, such data includes a date and time, a number and/or identification of audience members present in the media environment, a media source (e.g., radio media, television media, pay per view media, movies, Internet Protocol Television (IPTV), satellite television (TV), Internet radio, satellite radio, digital television), a media channel (e.g., broadcast channel, a domain name), and the demographics of the audience members. In this manner, the example people identification model controller can generate the model to learn who will be in the audience and at what time. Eventually, when training is complete, the model can be deployed at the meter and utilized to make informed decisions about the audience composition.

In some examples, the model can utilize the identification of audience members determined by the audience audio detector as a metric to determine whether the people meter is actually crediting the media exposure to the correct audience members. For example, the model could be used to determine if the audience views the same or similar media every Tuesday night at 8:00 pm, if there are usually two particular people present in the media audience, etc. In such an example, the model is used to verify the accuracy of the audience composition based on the information obtained.

FIG. 1 is an illustration of an example audience measurement system 100 having an example meter 102 to monitor an example media presentation environment 104. In the illustrated example of FIG. 1, the media presentation environment 104 includes panelists 106, 107, and 108, an example media device 110 that receives media from an example media source 112, and the meter 102. The meter 102 identifies the media presented by the media device 110 and reports media monitoring information to an example central facility 114 of an audience measurement entity via an example gateway 116 and an example network 118. The example meter 102 of FIG. 1 sends media monitoring data and/or audience monitoring data to the central facility 114 periodically, a-periodically and/or upon request by the central facility 114.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107, and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/ or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107, and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video, and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107, and 108).

The media source 112 may be any type of media provider (s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example meter 102 detects exposure to media and electronically stores monitoring information (e.g., a code/watermark detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The meter 102 of the illustrated example of FIG. 1 combines media measurement data and people metering data. For example, media measurement data is determined by monitoring media output by the media device 110 and/or other media presentation device(s), and people metering data (also referred to as demographic data, people monitoring data, etc.) is determined by monitoring people with to the meter 102. Thus, the example meter 102 provides dual functionality of a media meter to collect content media data and people meter to collect and/or associate demographic information corresponding to the collected media measurement data.

For example, the meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 102 and/or the example audience measurement system 100 extracts and/or processes the collected media identifying information and/or data received by the meter 102, which can be compared to reference data to perform source and/or content identification. Any other type(s) and/or number of media monitoring techniques can be supported by the meter 102.

Depending on the type(s) of metering the meter 102 is to perform, the meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 102 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the meter 102 of the illustrated example senses audio (e.g., acoustic signals or ambient audio) output (e.g., emitted) by the media device 110. For example, the meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an audio sensor (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the meter 102. The meter 102 of the illustrated example collects inputs (e.g., audience monitoring data) representative of the identities of the audience member(s) (e.g., the panelists 106, 107, and 108). In some examples, the meter 102 collects audience monitoring data by periodically or a-periodically prompting audience members in the monitored media presentation environment 104 to identify themselves as present in the audience (e.g., audience identification information). In some examples, the meter 102 responds to events (e.g., when the media device 110 is turned on, a channel is changed, an infrared control signal is detected, etc.) by prompting the audience member(s) to self-identify.

In some examples, the meter 102 determines an audience composition by utilizing the audio sensor 120. For example, the audio sensor 120 records samples of audio data associated with the audience members (e.g., the panelists 106, 107, 108) of the media presentation environment 104 and provides the audio data to the meter 102 to detect one or more speech patterns. In some examples, the meter 102 responds to events (e.g., when the media device 110 is turned on, a channel is changed, an infrared control signal is detected, etc.) by prompting the audio sensor 120 to record audio samples.

The example audio sensor 120 of the illustrated example of FIG. 1 is a microphone. The example audio sensor 120 receives ambient sound (e.g., free field audio) including audible media and/or sounds from audience members in the vicinity of the meter 102. Additionally or alternatively, the example audio sensor 120 may be implemented by a line input connection. The line input connection may allow an external microphone to be used with the meter 102 and/or, in some examples, may enable the audio sensor 120 to be directly connected to an output of a media device 110 (e.g., an auxiliary output of a television, an auxiliary output of an audio/video receiver of a home entertainment system, etc.).

In some examples, the meter 102 is positioned in a location such that the audio sensor 120 receives ambient audio produced by the television and/or other devices of the media presentation environment 104 (FIG. 1) with sufficient quality to identify media presented by the media device 110 and/or other devices of the media presentation environment 104 (e.g., a surround sound speaker system). For example, in examples disclosed herein, the meter 102 may be placed on top of the television, secured to the bottom of the television, etc. In some examples, the audio sensor 120 also receives audio produced by audience members (e.g., the panelists 106, 107, 108) of the media presentation environment 104 with sufficient quality to identify speech patterns of the audience members. While the illustrated example of FIG. 1 includes the audio sensor 120, examples disclosed herein can additionally or alternatively use multiple audio sensors. For example, one or more audio sensors can be positioned to receive audio from the media device, and one or more audio sensors can be positioned to receive audio from a location in which an audience is expected to be present (e.g., an expected distance corresponding to a couch, etc.). In such an example, audio sensor(s) positioned to receive audio from the media device are positioned relatively closer to the media device and the audio sensor(s) positioned to receive audio from the audience members are positioned relatively closer to the expected location of the audience members.

The audience monitoring data and the exposure data can then be compiled with the demographic data collected from audience members such as, for example, the panelists 106, 107, and 108 during registration to develop metrics reflecting, for example, the demographic composition of the audience. The demographic data includes, for example, age, gender, income level, educational level, marital status, geographic location, race, etc., of the panelist. In some examples, the registration of panelists includes recording samples of audio data for each member of the household. For example, the meter 102 records the panelists 106, 107, 108 saying one or more phrases. In examples disclosed herein, the recordings are used as reference samples of the audience members. In some examples, the meter 102 generates and stores reference audience signatures of the recorded reference samples. That is, the reference audience signatures can be stored locally at the meter 102, stored at the central facility 114 for signature matching, etc.

The example image sensor 125 of the illustrated example of FIG. 1 is a camera. The example image sensor 125 receives light waves, such as the light waves emitting from the example media device 110 and converts them into signals that convey information. Additionally or alternatively, the example image sensor 125 may be implemented by a line input connection, where the video and images presented by the example media device 110 are carried over an audio/video network (e.g., HDMI cable) to the example meter 102. The example image sensor 125 may not be included in the example meter 102. For example, it may not be necessary for the meter 102 to utilize the image sensor 125 to identify media data. However, in some examples, the image sensor 125 can be utilized for detection of media data.

In some examples, the meter 102 may be configured to receive audience information via an example input device 122 such as, for example, a remote control, an Apple iPad®, a cell phone, etc. In such examples, the meter 102 prompts the audience members to indicate their presence by pressing an appropriate input key on the input device 122. For example, the input device 122 may enable the audience member(s) (e.g., the panelists 106, 107, and 108 of FIG. 1) and/or an unregistered user (e.g., a visitor to a panelist household) to input information to the meter 102 of FIG. 1. This information includes registration data to configure the meter 102 and/or demographic data to identify the audience member(s). For example, the input device 122 may include a gender input interface, an age input interface, and a panelist identification input interface, etc. Although FIG. 1 illustrates multiple input devices 122, the example media presentation environment 104 may include an input device 122 with multiple inputs for multiple audience members. For example, an input device 122 can be utilized as a household input device 122 where panelists of the household may each have a corresponding input assigned to them.

The example gateway 116 of the illustrated example of FIG. 1 is a router that enables the meter 102 and/or other devices in the media presentation environment (e.g., the media device 110) to communicate with the network 118 (e.g., the Internet.)

In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the meter 102, the media device 110, etc. to transmit and/or receive data via the Internet. Alternatively, the gateway 116 may be coupled to such a LAN. In some examples, the gateway 116 may be implemented with the example meter 102 disclosed herein. In some examples, the gateway 116 may not be provided. In some such examples, the meter 102 may communicate with the central facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the meter 102. For example, the example central facility 114 of FIG. 1 combines audience monitoring data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 102 of the illustrated example provides a combination of media (e.g., content) metering and people metering. The example meter 102 of FIG. 1 is a stationary device that may be disposed on or near the media device 110. The meter 102 of FIG. 1 includes its own housing, processor, memory and/or software to perform the desired audience measurement and/or people monitoring functions.

In examples disclosed herein, an audience measurement entity provides the meter 102 to the panelist 106, 107, and 108 (or household of panelists) such that the meter 102 may be installed by the panelist 106, 107 and 108 by simply powering the meter 102 and placing the meter 102 in the media presentation environment 104 and/or near the media device 110 (e.g., near a television set). In some examples, more complex installation activities may be performed such as, for example, affixing the meter 102 to the media device 110, electronically connecting the meter 102 to the media device 110, etc.

To identify and/or confirm the presence of a panelist present in the media device 110, the example meter 102 of the illustrated example includes an example display 132. For example, the display 132 provides identification of the panelists 106, 107, 108 present in the media presentation environment 104. For example, in the illustrated example, the meter 102 displays indicia or visual indicators (e.g., illuminated numerals 1, 2 and 3) identifying and/or confirming the presence of the first panelist 106, the second panelist 107, and the third panelist 108.

Figure 2:
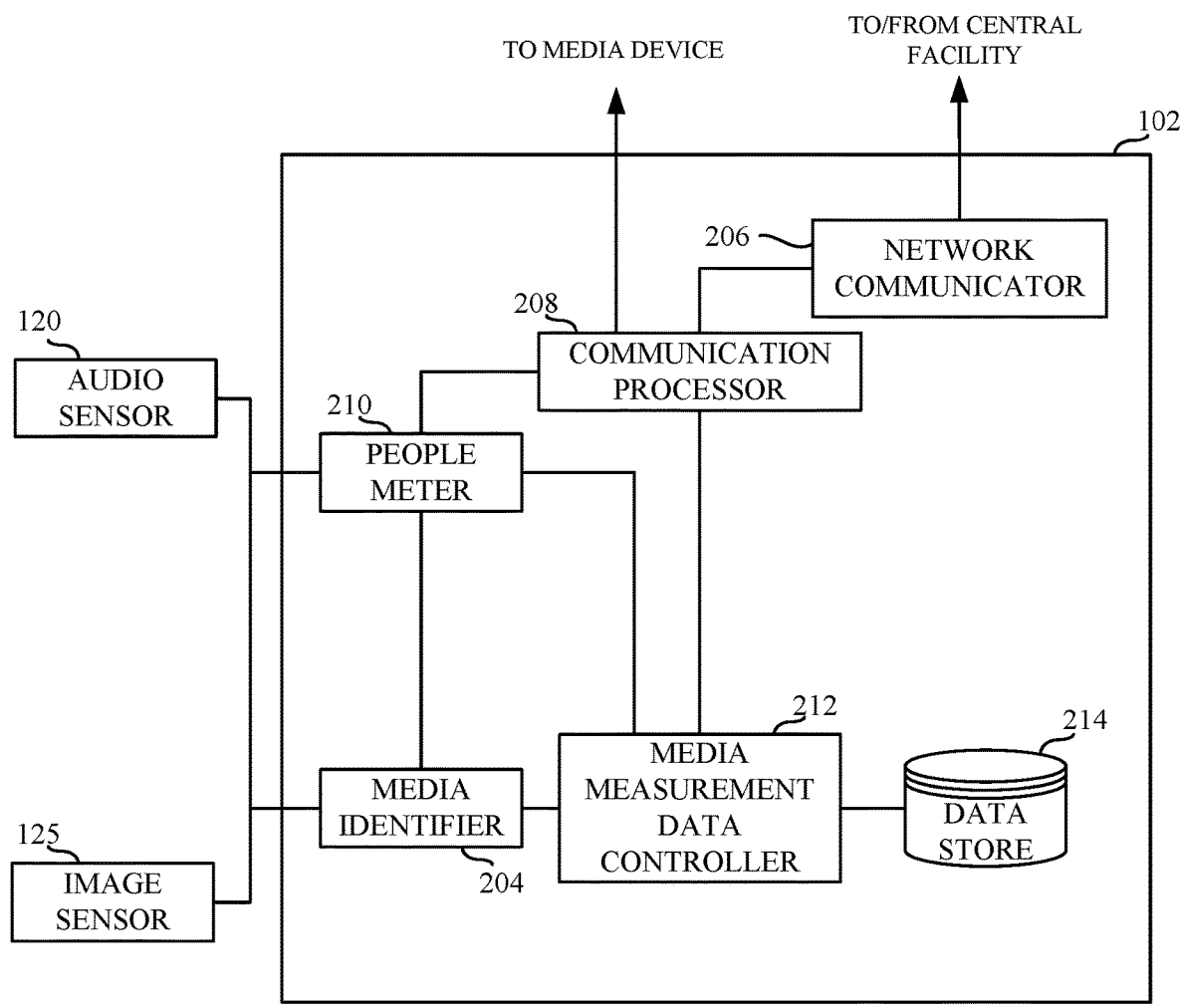
FIG. 2 illustrates a block diagram of the example meter of FIG. 1.

FIG. 2 illustrates a block diagram of the example meter 102 of FIG. 1 to generate exposure data for the media. The example meter 102 of FIG. 2 is coupled to the example audio sensor 120 of FIG. 1 to determine audience composition based on samples of audio data. The example meter 102 of FIG. 2 includes an example media identifier 204, an example network communicator 206, an example communication processor 208, an example people meter 210, an example media measurement data controller 212, and an example data store 214.

The example media identifier 204 of the illustrated example of FIG. 2 analyzes signals received via the image sensor 201 and/or audio received via the audio sensor 120 and identifies the media being presented. The example media identifier 204 of the illustrated example outputs an identifier of the media (e.g., media-identifying information) to the media measurement data controller 212. In some examples, the media identifier 204 utilizes audio and/or video watermarking techniques to identify the media. Additionally or alternatively, the media identifier 204 utilizes signature-based media identification techniques. For example, the media identifier 204 generates one or more signatures of the audio received from the audio sensor 120. As described above, the meter 102 may include one or more audio sensors. In such an example, the media identifier 204 may generate one or more signatures of the audio received from the audio sensor that is relatively closer to the media device (e.g., the media device 110). In some examples, the media identifier 204 outputs generated signatures of the audio data to the example people meter 210.

The example network communicator 206 of the illustrated example of FIG. 2 is a communication interface configured to receive and/or otherwise transmit corresponding communications to and/or from the central facility 114. In the illustrated example, the network communicator 206 facilitates wired communication via an Ethernet network hosted by the example gateway 116 of FIG. 1. In some examples, the network communicator 206 is implemented by a Wi-Fi radio that communicates via the LAN hosted by the example gateway 116. In other examples disclosed herein, any other type of wireless transceiver may additionally or alternatively be used to implement the network communicator 206. In examples disclosed herein, the example network communicator 206 communicates information to the communication processor 208 which performs actions based on the received information. In other examples disclosed herein, the network communicator 206 may transmit media measurement information provided by the media measurement data controller 212 (e.g., data stored in the data store 214) to the central facility 114 of the media presentation environment 104.

The example communication processor 208 of the illustrated example of FIG. 2 receives information from the network communicator 206 and performs actions based on that received information. For example, the communication processor 208 packages records corresponding to collected exposure data and transmits records to the central facility 114. In examples disclosed herein, the communication processor 208 communicates with the people meter 210 and/or a media measurement data controller 212 to transmit people count data, demographic data, etc., to the network communicator 206.

The example people meter 210 of the illustrated example of FIG. 2 determines audience monitoring data representative of the number and/or identities of the audience member (s) (e.g., panelists) present in the media presentation environment 104. In the illustrated example, the people meter 210 is coupled to the audio sensor 120. In some examples, the people meter 210 is coupled to the audio sensor 120 via a direct connection (e.g., Ethernet) or indirect communication through one or more intermediary components. In some examples, the audio sensor 120 is included in (e.g., integrated with) the meter 102. The example people meter 210 collects data from the example audio sensor 120, the example media identifier 204, and data from example input device(s) 122 corresponding to audience monitoring data. In some examples, the meter 102 includes one or more audio sensors. In such examples, the people meter 210 obtains audio data from the audio sensors that are relatively closer to the expected location of audience members. The people meter 210 may then generate signatures of the audio data. In some examples, the people meter 210 and the media identifier 204 generate signatures using the same technique (e.g., generate unhashed signatures, generate hashed signatures, etc.). Additionally or alternatively, the people meter 210 and the media identifier 204 can generate signatures using different techniques. The example people meter 210 provides the audience monitoring data to the media measurement data controller 212 such that the audience monitoring data can be correlated with the media identification data to facilitate an identification of which media was presented to which audience member (e.g., exposure data). The example people meter 210 is described in further detail below in connection with FIGS. 3, 4, and 5.

The example media measurement data controller 212 of the illustrated example of FIG. 2 receives media identifying information (e.g., a code, a signature, etc.) from the media identifier 204 and audience monitoring data from the people meter 210 and stores the received information in the data store 214. The example media measurement data controller 212 periodically and/or a-periodically transmits, via the network communicator 206, the media measurement information stored in the data store 214 to the central facility 114 for post-processing of media measurement data, aggregation and/or preparation of media monitoring reports. In some examples, the media measurement data controller 212 generates exposure data. For example, the media measurement data controller 212 correlates the media identifying information with audience monitoring data, as described above, to generate exposure data.

The example data store 214 of the illustrated example of FIG. 2 may be implemented by any device for storing data such as, for example, flash memory, magnetic media, optical media, etc. Furthermore, the data stored in the example data store 214 may be in any data format such as, for example, binary data, comma delimited data, tab delimited data, structured query language (SQL) structures, etc. In the illustrated example, the example data store 214 stores media identifying information collected by the media identifier 204 and audience monitoring data collected by the people meter 210.

Figure 3:
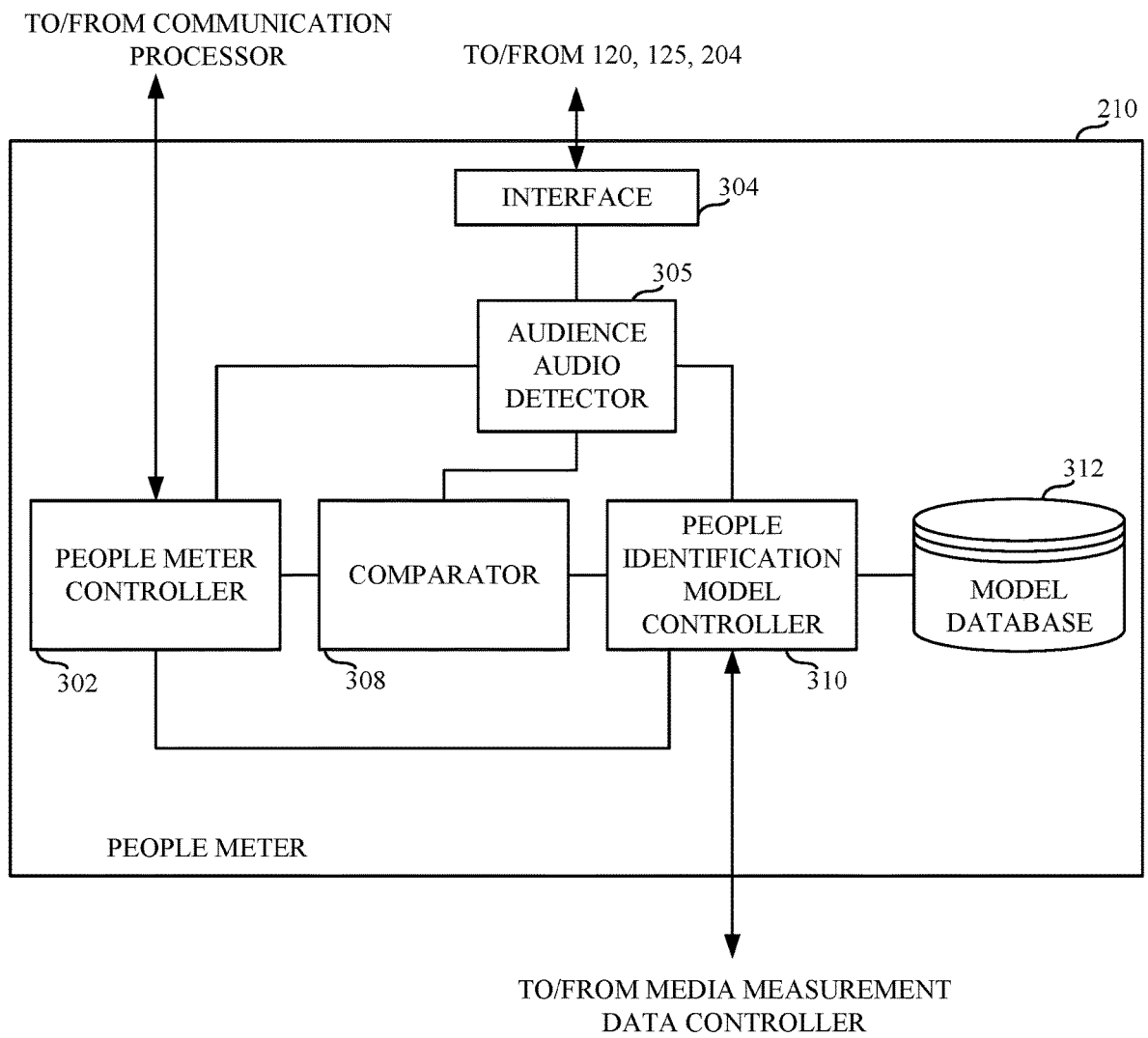
FIG. 3 illustrates a block diagram of an example people meter included in the example meter of FIG. 2 to determine an audience composition for audience monitoring data.

FIG. 3 illustrates a block diagram of the example people meter 210 of FIG. 2, which is to determine an audience composition for audience monitoring data in accordance with teachings of this disclosure. The example people meter 210 includes an example people meter controller 302, an example interface 304, an example audience audio detector 305, an example comparator 308, an example people identification model controller 310, and an example model database 312.

The example people meter controller 302 of the illustrated example of FIG. 3 obtains user input from example input device(s) 122. For example, the panelists 106, 107, and 108 may press a key on the respective input device(s) 122 indicating they are in the room (e.g., the media presentation environment 104). In some examples, the panelists 106, 107, 108 enter a username, password, and/or other information to indicate who they are and that they are in the room viewing media. In some examples, the people meter controller 302 determines a people count based on the user input obtained from the input device(s) 122. For example, the people meter controller 302 may determine that two people (e.g., two of the panelists 106, 107, 108) have indicated their presence in the media presentation environment 104. In some examples, the people meter controller 302 determines a people count in response to the media device 110 turning on. The example people meter controller 302 provides the people count to the example comparator 308.

In some examples, the people meter controller 302 generates prompting messages at periodic and/or aperiodic scheduling intervals. For example, the people meter controller 302 generates a prompting message to be displayed on the media device 110 and/or a display of the meter 102. The prompting messages can include questions and/or requests to which the panelists 106, 107, 108 are to respond. For example, the people meter controller 302 may generate a prompting message every 42 minutes (or at some other interval) asking the panelists 106, 107, 108 if they are still viewing the media. In some examples, the people meter controller 302 generates a prompting message based on one or more events, such as when the media device 110 is turned on, when the channel has changed, when the media source has changed, etc. In some examples, the people meter controller 302 receives a trigger from the audience audio detector 305 to determine whether to generate prompting messages or not generate prompting messages. The example people meter controller 302 communicates the prompting messages through the communication processor 208 of FIG. 2 to the media device 110.

The example interface 304 of the illustrated example of FIG. 3 communicates between the example audio sensor 120 and the example audience audio detector 305. For example, the interface 304 obtains data from the audio sensor 120 and provides the data to the example audience audio detector 305. In some examples, the interface 304 obtains requests from the example audience audio detector 305 and passes the requests to the example audio sensor 120. For example, the interface 304 enables communication between the audio sensor 120 and the audience audio detector 305. In some examples, the interface 304 enables communication between the media identifier 204 and the audience audio detector 305. For example, the interface 304 obtains data (e.g., signatures) from the media identifier 204 and provides the data to the example audience audio detector 305. The example interface 304 may be any type of interface, such as a network interface card (NIC), an analog-to-digital converter, a digital-to-analog converter, Universal Serial Bus (USB), GigE, FireWire, Camera Link®, etc.

The example audience audio detector 305 of the illustrated example of FIG. 3 obtains audio data from the example interface 304 and determines the audience composition based on the audio data. For example, the audience audio detector 305 obtains samples of audio data from the audio sensor 120 via the interface 304 and analyzes the samples. For example, the audience audio detector can obtain audio data from the audio sensor 120 and/or the audio sensor closer to the expected location of the audience (e.g., the meter 102 includes multiple audio sensors). In some examples, the audience audio detector 305 includes a signature generator (not illustrated) to generate one or more signatures of the audio data (e.g., using the same signature generating technique as the media identifier 204 (FIG. 2), using a different signature generating technique as the media identifier 204, etc.).

Additionally or alternatively, the audience audio detector 305 obtains signatures of the audio data from the media identifier 204 via the interface 304. That is, in such an example, the audience audio detector 305 may not include a signature generator and instead obtains signatures generated by the media identifier 204. In some examples, the audience audio detector 305 identifies one or more distinct speech patterns in the signatures. The example audience audio detector 305 determines a people count based on the number of distinct speech patterns. In some examples, the audience audio detector 305 analyzes the detected signatures in comparison to the reference audience signatures to identify audience member(s) (e.g., the voice(s) of the audience member(s)). The example audience audio detector 305 identifies audience members and provides the identification to the example comparator 308, the example people identification model controller 310, and/or the example people meter controller 302.

In some examples, the audience audio detector 305 is unable to identify the person in the generated signature corresponding to a detected speech pattern. For example, the person corresponding to the speech pattern in the generated signature may be a visitor, a distant relative of the panelist, etc. In such an example, the audience audio detector 305 triggers the people meter controller 302 to generate a prompting message for additional member logging. As used herein, member logging occurs when a given audience member logs into their respective input device 122 (or into a common input device 122 used in the environment) to indicate that they are viewing the media. The example people meter controller 302 generates the prompting message in an effort to obtain a response to verify the audience composition and generate accurate audience monitoring data. The example audience audio detector 305 is described in further detail below in connection with FIG. 4.

The example comparator 308 of the illustrated example of FIG. 3 obtains the people count at time t and the people count at time t−1 from the example audience audio detector 305 and compares the two count values. That is, the comparator 308 compares the people count at a first time (e.g., time t) and the people count at a relatively earlier time (e.g., time t−1). The example comparator 308 determines if the count values are equal in value. When the comparator 308 determines the count values match, then the people count is verified. In some examples, when the people count is verified, the example comparator 308 notifies the example people meter controller 302 to reset a scheduling interval timer (e.g., a counter, clock, or other timing mechanisms) that initiate the generation of prompting messages. For example, if the people meter controller 302 is configured to generate prompting messages every 42 minutes, then a timer is set to 42 minutes. When the timer expires, a prompting message is triggered. However, if the comparator 308 verifies the number of people (e.g., the panelists 106, 107, 108) in the media presentation environment 104, a prompting message is not needed to determine whether people are still viewing the media.

In some examples, the comparator 308 determines the two people count values are not equal. For example, there may only be one people count (e.g., audio sampling was not previously active). Thus, the comparator 308 determines the people count does not match (e.g., compared to a people count of zero corresponding to an inactive audio sensor 120 (FIG. 1)). In some examples, the people counts do not match due to an audience member leaving the media presentation environment 104, an audience member joining the media presentation environment 104, etc. In such examples, the example comparator 308 triggers the audience audio detector 305 to identify the audience member(s) corresponding to the identified speech patterns.

The example comparator 308 provides the people count to the example people identification model controller 310. In some examples, the comparator 308 determines a time of the comparison between the people counts and provides the time to the people identification model controller 310. For example, the comparator 308 may identify 4:58 pm as the time corresponding to the comparison between the people counts. In some examples, the comparator 308 updates, or otherwise trains, the people identification model when the comparator 308 provides the people count and the time corresponding to the comparison to the people identification model controller 310.

The example people identification model controller 310 of the illustrated example of FIG. 3 trains a people identification model based on data obtained from the example comparator 308, the example people meter controller 302, and the example audience audio detector 305. In some examples, the people identification model controller 310 is in communication with the example media measurement data controller 212 of FIG. 2. For example, the people identification model controller 310 obtains information from the media measurement data controller 212 and provides information to the media measurement data controller 212. In some examples, the data obtained from the media measurement data controller 212 by the people identification model controller 310 includes media identifying information. For example, the people identification model controller 310 queries the media measurement data controller 212 for media identifying information at the time corresponding to the comparison of people counts and/or the time corresponding to the identification of audience members. In some examples, the media measurement data controller 212 provides the data to the people identification model controller 310 without receiving a request and/or query. In this manner, the people identification model controller 310 obtains the audience composition at, for example, 4:58 pm and obtains the broadcast channel airing on the media device 110 at 4:58 pm. In some examples, the people identification model controller 310 utilizes the data from one or more of the people meter controller 302, the audience audio detector 305, the comparator 308, and the media measurement data controller 212 to train a model to predict a verified audience composition for particular dates and times.

In some examples, the people identification model controller 310 passes the verified audience composition to the media measurement data controller 212. For example, the people identification model controller 310 obtains the verified audience composition, packages the information, and provides the information to the media measurement data controller 212 for generation of exposure data. For example, the media measurement data controller 212 utilizes the information to correlate the verified audience composition with the media identifying information. In some examples, the people identification model controller 310 obtains demographic information from the people meter controller 302 to pass to the media measurement data controller 212. For example, the people meter controller 302 determines the demographic information corresponding to the audience members logged into the meter 102 and/or identified by the audience audio detector 305. In this manner, the example people identification model controller 310 passes the audience composition (e.g., the people count and the demographic information of the identified panelists), and the time corresponding to the identification to the media measurement data controller 212 to generate exposure data. The example people identification model controller 310 is described in further detail below in connection with FIG. 5.

The example model database 312 of the illustrated example of FIG. 3 stores people identification models generated by the people identification model controller 310. For example, the model database 312 may periodically or a-periodically receive new, updated, and/or trained people identification models. In some examples, the model database 312 stores one people identification model. In some examples, the model database 312 stores multiple people identification models. The example model database 312 is utilized for subsequent retrieval by the people meter controller 302, the audience audio detector 305, and/or the people identification model controller 310.

Figure 4:
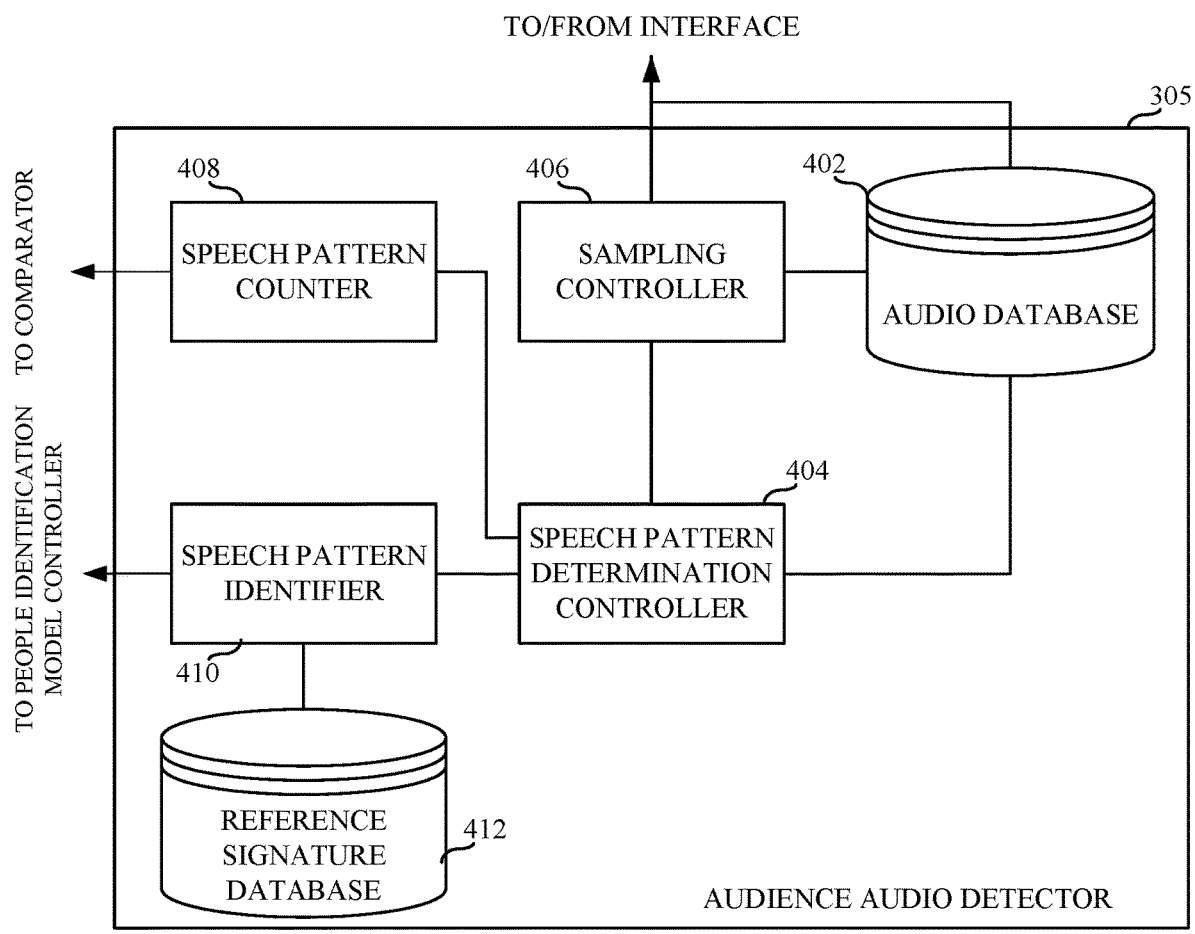
FIG. 4 illustrates a block diagram of an example audience audio detector included in the example people meter of FIG. 3 to identify audience members.

FIG. 4 is a block diagram illustrating an example implementation of the audience audio detector 305 of FIG. 3. The example audience audio detector 305 of FIG. 3 includes an example audio database 402, an example speech pattern determination controller 404, an example sampling controller 406, an example speech pattern counter 408, and an example speech pattern identifier 410.

The example audio database 402 of the illustrated example of FIG. 4 stores samples of audience audio data and/or signatures obtained from the example interface 304 of FIG. 3. For example, the audio database 402 stores the samples of audience audio data captured by the example audio sensor 120 and/or signatures generated by the example media identifier 204 for current and/or subsequent use by the speech pattern determination controller 404. In some examples, the audio database 402 stores tagged and/or analyzed samples of audience audio data and/or signatures.

The example speech pattern determination controller 404 of the illustrated example of FIG. 4 obtains samples of audio data and/or signatures from the example audio database 402. The example speech pattern determination controller 404 analyzes the samples and/or signatures for speech patterns. In an example operation, the speech pattern determination controller 404 identifies portions of the audio data that warrant further attention. For example, the speech pattern determination controller 404 filters the samples for human voices. That is, the speech pattern determination controller applies a low pass filter, a high pass filter, a bandpass filter, etc. to remove frequencies incompatible with human speech (e.g., frequencies corresponding to a dog barking, a police siren, etc.).

In some examples, the speech pattern determination controller 404 does not detect speech patterns in the sample. In such an example, the speech pattern determination controller 404 may send a trigger to the sampling controller 406 to prompt the sampling controller 406 to record additional samples of audio data of the media presentation environment 104. For example, the audience audio detector 305 may be initiated to identify audience member speech patterns when the media device 110 is turned on. In such examples, when the media device 110 is turned on, an audience is generally present. If the example speech pattern determination controller 404 does not detect speech patterns, then a recapture of the environment is to occur. For example, an audience member may have briefly left the room after turning on the media device 110, the audio sensor 120 may have not captured the media presentation environment 104 when the media device 110 was turned on, etc.

In some examples, the speech pattern determination controller 404 provides the evaluation results to the example people identification model controller 310 (FIG. 3). The example people identification model controller 310 utilizes the filtered output and/or evaluation results as training data for predicting a people count of the media presentation environment 104.

The example speech pattern counter 408 of the illustrated example of FIG. 4 obtains the filtered output from the speech pattern determination controller 404 corresponding to a number, if any, of speech patterns. For example, the speech pattern determination controller 404 provides information indicative of the evaluation of the signatures to the speech pattern counter 408. In examples disclosed herein, the speech pattern counter 408 determines a number of distinct speech patterns detected in the filtered output. For example, the speech pattern counter 408 may analyze the filtered output to determine the number of distinct speech patterns based on one or more characteristics of the signatures. For example, the characteristics can include vocal tract length, vocal tract shape, pitch, speaking rate, etc. Additionally or alternatively, the speech pattern counter 408 can identify unique speech patterns based on a number of matches corresponding to different reference audience signatures that match the generated signature during a monitoring interval. For example, the monitoring interval can be 30 seconds. In some examples, the monitoring interval is greater than or less than 30 seconds. The example speech pattern counter 408 determines the number of different reference audience signature sets (e.g., corresponding to different audience members) during the monitoring interval. In such an example, the number of matches during the monitoring interval is the number of identified unique speech patterns (e.g., the people count).

The example speech pattern counter 408 includes a counter, such as a device which stores a number of times a distinct characteristic corresponds to a speech pattern. If the example speech pattern counter 408 determines that speech patterns were detected, then the example speech pattern counter 408 increments the counter to the number of speech patterns that were detected. For example, if the speech pattern counter 408 detected five speech patterns, the speech pattern counter 408 stores a count of five speech patterns. If the example speech pattern counter 408 does not receive information indicative of a detection of speech patterns, then the example speech pattern counter 408 updates the speech pattern count with a count of zero. In some examples disclosed herein, the speech pattern count is the people count (e.g., each detected speech pattern corresponds to a person).

In some examples, the speech pattern counter 408 tags the sample of audio data and/or signatures with the people count. For example, the sample includes metadata indicative of a time the sample was recorded, the size of the sample, the device that captured the sample, etc., and further includes the people count appended by the speech pattern counter 408. In some examples, the tagged sample is stored in the audio database 402 and/or provided to the example comparator 308 and the example people identification model controller 310.

The example speech pattern identifier 410 of the illustrated example of FIG. 4 obtains the filtered output from the speech pattern determination controller 404 corresponding to a number, if any, of speech patterns. For example, the speech pattern determination controller 404 provides information indicative of the evaluation of the sample of audio data and/or signatures to the speech pattern identifier 410. The example speech pattern identifier 410 includes audience data, such as reference audience signatures of the speech patterns of the audience members (e.g., panelists) of the household (e.g., the panelists 106, 107, 108 of FIG. 1). That is, the speech pattern identifier 410 includes reference speech patterns generated during panelist registration. If the example speech pattern identifier 410 determines speech patterns were detected, the example speech pattern identifier 410 compares the signatures including the detected speech patterns to the reference speech pattern signatures. For example, the speech pattern identifier 410 compares the one or more characteristics of the detected speech patterns and the reference speech patterns to determine a match. If the speech pattern identifier 410 determines a match, the speech pattern identifier 410 logs the corresponding audience member as being identified. In some examples, if the speech pattern identifier 410 determines the detected speech pattern does not match any of the stored audience speech patterns, the speech pattern identifier 410 compares the generated signature of the detected speech pattern to reference signatures stored in the example reference signature database 412 corresponding to media (e.g., television shows, movies, etc.). That is, the speech pattern identifier 410 determines whether the detected speech pattern corresponds to a speaker in a media program rather than an audience member. If the speech pattern identifier 410 determines the detected speech pattern does not match any of the stored audience member speech patterns (e.g., reference audience signatures) or reference signatures, the speech pattern identifier 410 may add the respective speech to the audience audio data.

In some examples, the speech pattern identifier 410 determines whether the number of identified audience members matches the number of detected speech patterns. For example, the speech pattern identifier 410 compares the number of identified audience members to the number of detected speech patterns. In some examples, the speech pattern identifier 410 determines there are more detected speech patterns than identified audience members. In such an example, the audio sensor 120 may have recorded audio corresponding to the voice of a visitor who has not been registered with the meter 102. If the speech pattern identifier 410 determines the number of identified audience members does not match the number of detected speech patterns, the example people meter controller 302 initiates a prompt to the audience. For example, the people meter controller 302 generates a prompting message requesting the audience identify themselves (e.g., enter respective panelist numbers, visitor numbers, etc.).

If the example speech pattern identifier 410 determines the number of identified audience members matches the number of detected speech patterns, the example speech pattern identifier 410 determines a time of the identification. For example, the speech pattern identifier 410 identifies the timestamp of when the match between the identified speech pattern and the reference speech pattern was determined.

In some examples, the speech pattern identifier 410 tags the sample of audio data and/or signatures with the audience member identity (e.g., assigned panelist number, visitor number, etc.). For example, the sample includes metadata indicative of a time the sample was recorded, the size of the sample, the device that captured the sample, etc., and further includes the one or more audience member identities identified by the speech pattern identifier 410. In some examples, the tagged sample is stored in the audio database 402 and/or provided to the example people meter controller 302 and the example people identification model controller 310.

In some examples, the audio database 402, the speech pattern determination controller 404, the sampling controller 406, the speech pattern counter 408, the speech pattern identifier 410 and/or otherwise the audience audio detector 305 may be coupled to the people identification model controller 310 of FIG. 3 in an effort to provide training data (e.g., people monitoring data) to the people identification model. In some examples, it is beneficial to provide training data (e.g., people monitoring data) to the people identification model controller 310 to train the people identification model to predict audience composition at particular times throughout the day.

Figure 5:
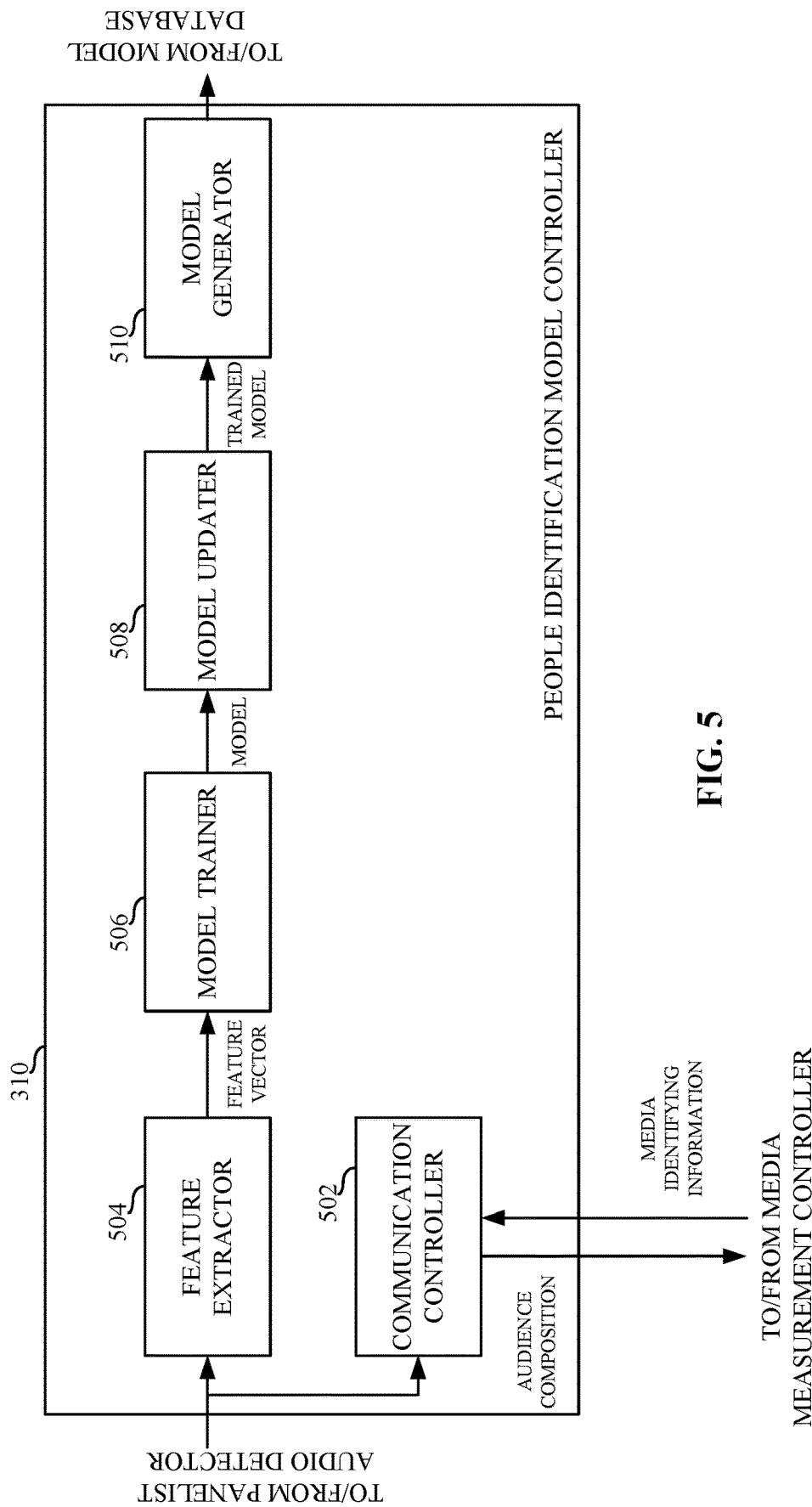
FIG. 5 illustrates a block diagram of an example people identification model controller included in the example people meter of FIG. 3 to train a model to determine an audience composition of the media presentation environment of FIG. 1.

Turning to FIG. 5, a block diagram illustrating the example people identification model controller 310 of FIG. 3 is depicted to train a model to learn about the presence of an audience of a household media presentation environment. The example people identification model controller 310 includes an example communication controller 502, an example feature extractor 504, an example model trainer 506, an example model updater 508, and an example model generator 510.

The example communication controller 502 of the illustrated example of FIG. 5 obtains information from the example audience audio detector 305 of FIG. 3 to pass to the example media measurement data controller 212 of FIG. 2. The example communication controller 502 is communicatively coupled to the example audience audio detector 305, the example media measurement data controller 212, and the example feature extractor 504. In some examples, the communication controller 502 provides the audience composition to the media measurement data controller 212. For example, the audience audio detector 305 provides an updated and/or accurate audience composition (e.g., panelists 106, 107, 108) viewing media in the media presentation environment 104. An updated and/or accurate audience composition is a verified audience composition based on the audience member identification from the audience audio detector 305 of FIG. 3. In some examples, the communication controller 502 obtains demographic data from the people meter controller 302, indicative of the demographics of the people in the media presentation environment 104, and provides the demographic data to the media measurement data controller 212.

The example feature extractor 504 of the illustrated example of FIG. 5 extracts features from information obtained from the example audience audio detector 305 of FIG. 3, the example people meter controller 302 of FIG. 3, and the media measurement data controller 212 of FIG. 2. For example, the feature extractor 504 obtains people monitoring data, over time, from one or more of the audience audio detector 305, the people meter controller 302, and the media measurement data controller 212, and generates a feature vector corresponding to the people monitoring data. In some examples, the feature extractor 504 obtains multiple instances of people monitoring data before generating a feature vector. For example, the feature extractor 504 obtains people monitoring data over the span of a week. The example feature extractor 504 generates or builds derived values of feature vectors (e.g., representative of features in the people monitoring data) that are to be informative and non-redundant to facilitate the training phase of the people identification model controller 310. As used herein, a feature vector is an n-dimensional array (e.g., a vector) of features that represent some physical environment, media display, measurement parameter, etc. For example, a feature vector represents descriptive characteristics of the media presentation environment at a particular date and time.

In the illustrated example of FIG. 5, the feature vector can determine the number of people and/or the identity of the people accounted for in the media presentation environment 104 in addition to the time at which they were accounted, and the media displayed at the time for which they were accounted. The feature vector provided by the feature extractor 504 facilitates the model trainer 506 in training a people identification model to determine an audience composition for a time and a media type. For example, at time t1 on date X in the media presentation environment 104, the feature extractor 504 extracts data indicative of media identifying information for a broadcast of "ABC the Bachelor," as well as data indicative that three identified audience members are viewing the broadcast.

In some examples, these extracted features, by themselves, may have limited usefulness, because there is just one such feature event in a given instance of people monitoring data. However, if the feature extractor 504 extracts feature data from multiple instances of people monitoring data, the generated feature vector may be sufficient to train the people identification model. For example, the feature extractor 504 extracts feature data having date X, Y, and Z at the time t1, indicative of media identifying information for the broadcast of "ABC the Bachelor" and indicative that three identified audience members are viewing the broadcast. In such an example, the model trainer 506 can utilize the feature vector to train the people identification model to predict the audience composition for time t1.

The example model trainer 506 of the illustrated example of FIG. 5 trains the people identification model based on the output feature vector of the feature extractor 504. The model trainer 506 operates in a training mode where it receives multiple instances of people monitoring data, generates a prediction, and outputs a people identification model based on that prediction. For the example model trainer 506 generates a people identification model, the model trainer 506 receives feature vectors corresponding to actual representations of the media presentation environment 104. For example, during a training mode, verifications are made about the audience composition of the media presentation environment 104 so that the data they provide to the audience audio detector 305 is suitable for learning. For example, the model trainer 506 receives a feature vector indicative of the features of an actual media presentation environment and identifies a pattern in the features that maps the dates and times of the actual media presentation environment to the audience composition and outputs a model that captures these daily and/or weekly patterns. The example model trainer 506 provides the output people identification model to the example model updater 508 to assist in generating predictions about the audience composition at subsequent dates and times.

The example model updater 508 of the illustrated example of FIG. 5 flags a people identification model received from the model trainer 506 as new and/or updated. For example, the model updater 508 can receive a people identification model from the model trainer 506 that provides a prediction algorithm to determine an audience composition of people in the media presentation environment 104. The model updater 508 determines that a people identification model of this type is new and, therefore, tags it as new. In some examples, the model updater 508 determines that a people identification model of this type has been generated previously and, therefore, will flag the model most recently generated as updated. The example model updater 508 provides the new and/or updated model to the model generator 510.

The example model generator 510 of the illustrated example of FIG. 5 generates a people identification model for publishing. For example, the model generator 510 may receive a notification from the model updater 508 that a new and/or updated people identification model has been trained and the model generator 510 may create a file in which the people identification model is published so that the people identification model can be saved and/or stored as the file. In some examples, the model generator 510 provides a notification to the people meter controller 302 and/or the audience audio detector 305 that a people identification model is ready to be transformed and published. In some examples, the model generator 510 stores the people identification model in the example model database 312 for subsequent retrieval by the people meter controller 302.

In some examples, the people identification model controller 310 determines a people identification model is trained and ready for use when the prediction meets a threshold amount of error. In some examples, the people meter controller 302 and/or audience audio detector 305 implements the trained people identification model to determine an audience composition of people in a media presentation environment. In some examples, the example people meter 210 implements the people identification model. In such an example, the people identification model would obtain audio data from the audio sensor 120 to make informed decisions about audience composition, without the use of audience input data. In this manner, the people identification model may augment or replace the people meter controller 302, the audience audio detector 305, and the comparator 308.

While example manners of implementing the people meter 210 of FIG. 2 is illustrated in FIGS. 3, 4, and 5, one or more of the elements, processes and/or devices illustrated in FIGS. 3, 4, and 5 may be combined, divided, re-arranged, omitted, eliminated and/or implemented in any other way. Further, the example people meter controller 302, the example interface 304, the example audience audio detector 305, the example comparator 308, the example people identification model controller 310, the example model database 312, the example audio database 402, the example speech pattern determination controller 404, the example sampling controller 406, the example speech pattern counter 408, the example speech pattern identifier 410, the example reference signature database 412, the example communication controller 502, the example feature extractor 504, the example model trainer 506, the example model updater 508, the example model generator 510 and/or, more generally, the example people meter 210 of FIG. 2 may be implemented by hardware, software, firmware and/or any combination of hardware, software and/or firmware. Thus, for example, any of the example people meter controller 302, the example interface 304, the example audience audio detector 305, the example comparator 308, the example people identification model controller 310, the example model database 312, the example audio database 402, the example speech pattern determination controller 404, the example sampling control-ler 406, the example speech pattern counter 408, the example speech pattern identifier 410, the example reference signature database 412, the example communication controller 502, the example feature extractor 504, the example model trainer 506, the example model updater 508, the example model generator 510 and/or, more generally, the example people meter 210 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example, people meter controller 302, the example interface 304, the example audience audio detector 305, the example comparator 308, the example people identification model controller 310, the example model database 312, the example audio database 402, the example speech pattern determination controller 404, the example sampling controller 406, the example speech pattern counter 408, the example speech pattern identifier 410, the example reference signature database 412, the example communication controller 502, the example feature extractor 504, the example model trainer 506, the example model updater 508, the example model generator 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example people meter of FIG. 2 may include one or more elements, processes and/or devices in addition to, or instead of, those illustrated in FIGS. 3, 4, and 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
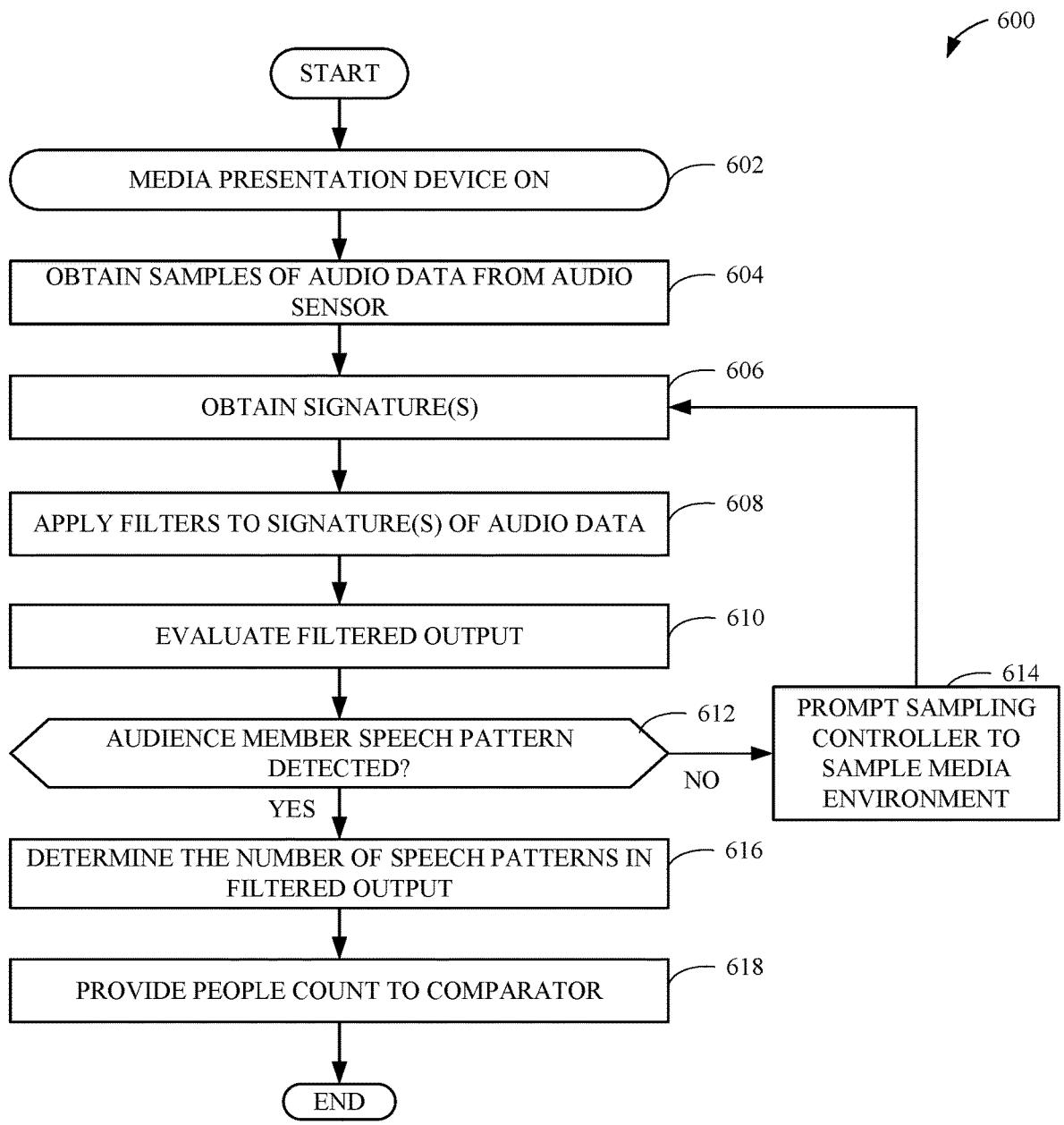
FIG. 6 is a flowchart representative of machine readable instructions which may be executed to implement the example audience audio detector of FIGS. 3 and/or 4 to identify audience members.
Figure 7:
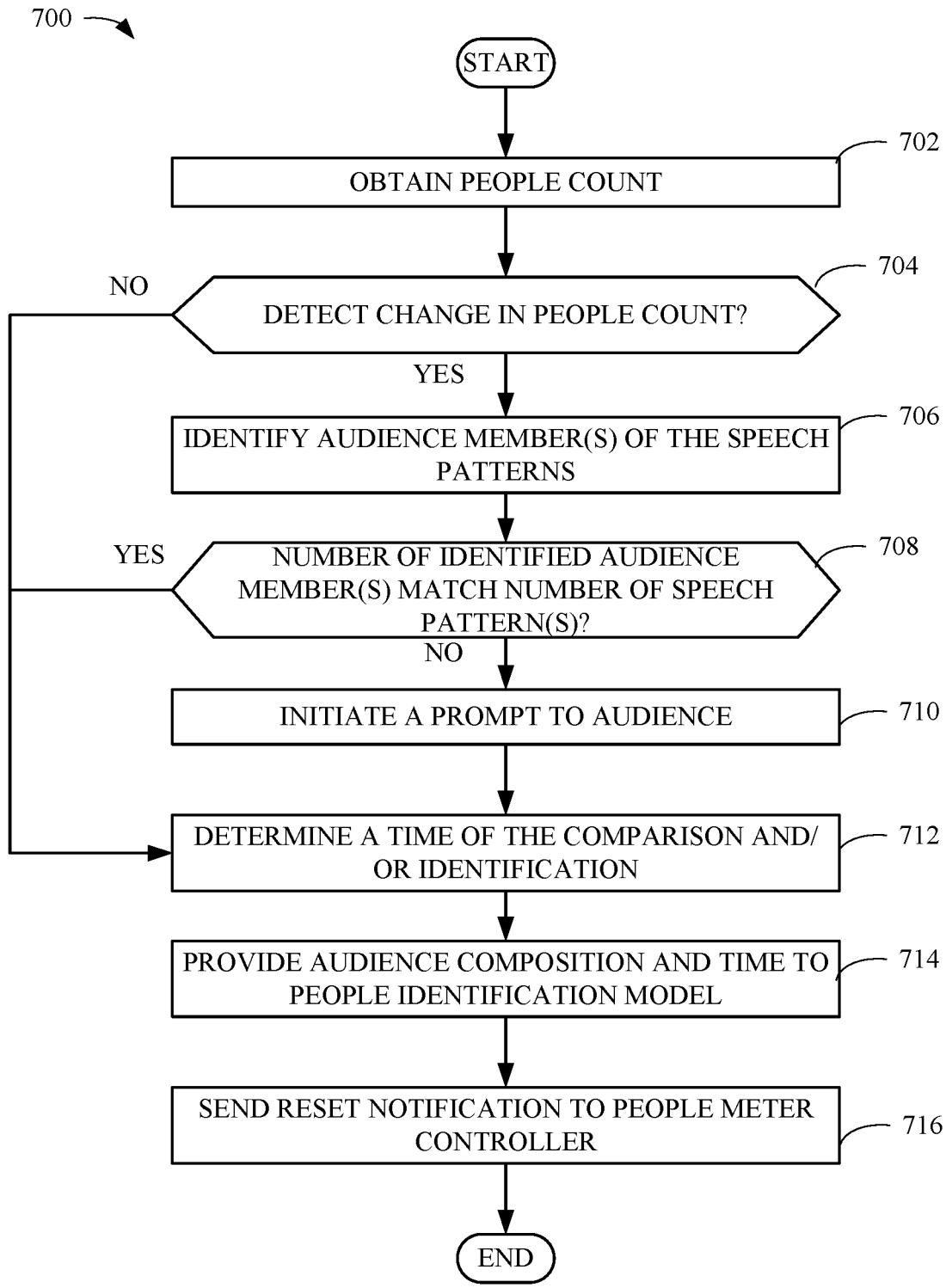
FIG. 7 is a flowchart representative of machine readable instructions which may be executed to implement the example people meter of FIGS. 2, 3, 4, and/or 5 to verify an audience composition of the media presentation environment of FIG. 1.
Figure 8:
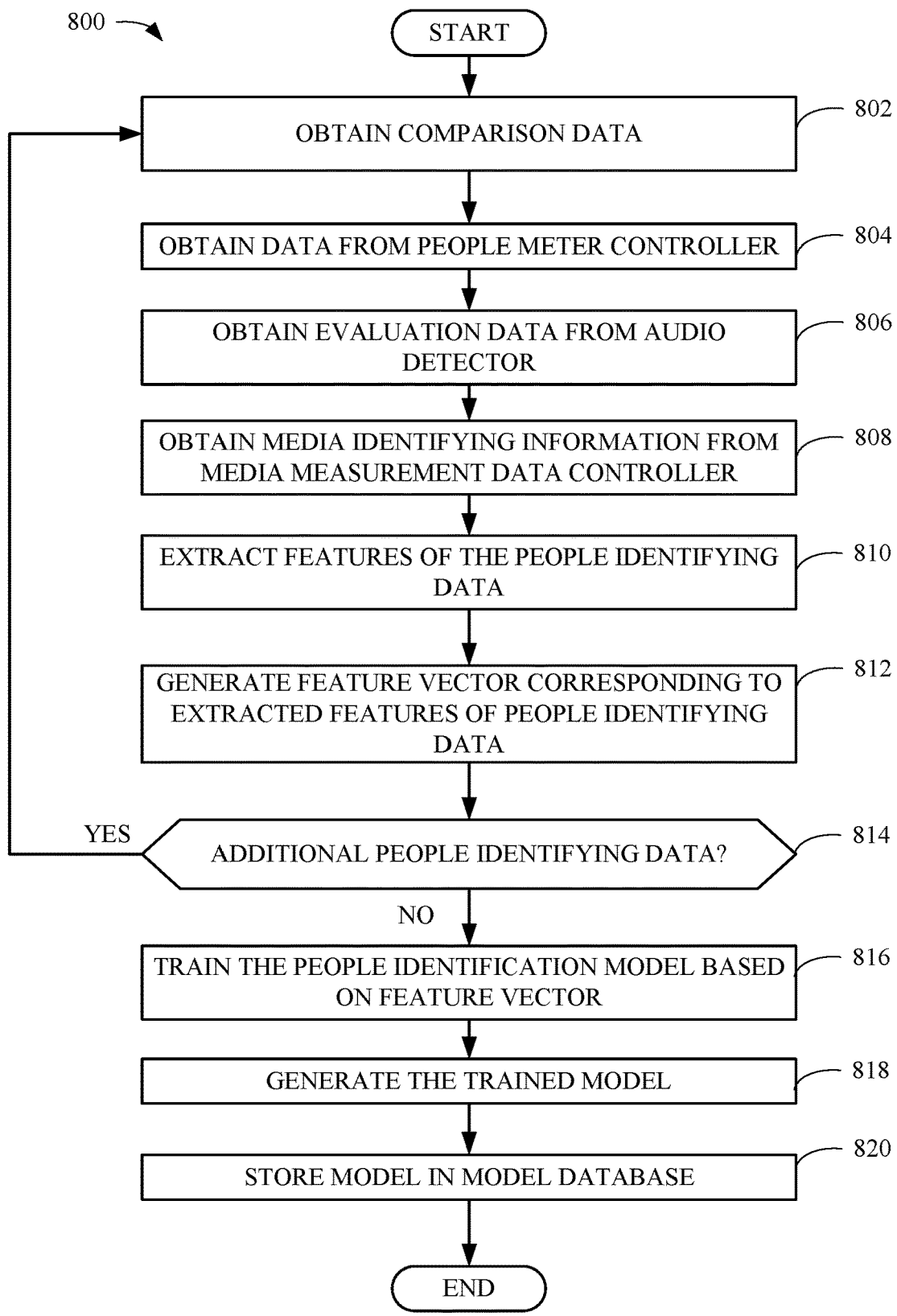
FIG. 8 is a flowchart representative of machine readable instructions which may be executed to implement the example people identification model controller of FIGS. 3 and/or 5 to train the model to determine the audience composition of the media presentation environment of FIG. 1.

A flowchart representative of example hardware logic, machine readable instructions, hardware implemented state machines, and/or any combination thereof for implementing the people meter 210 of FIGS. 3, 4, and 5 are shown in FIGS. 6-8. The machine readable instructions may be one or more executable programs or portion(s) of an executable program for execution by a computer processor and/or processor circuitry, such as the processor 912 shown in the example processor platform 900 discussed below in connection with FIGS. 6-8. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6-9, many other methods of implementing the example people meter 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 6, 7, and 8 illustrate programs that are executed by the example people meter 210 to determine an accurate audience composition utilizing audience input and/or audio data. FIG. 6 illustrates an example program 600 implemented by the example audience audio detector 305 of FIGS. 3 and/or 4 to determine a people count. FIG. 7 illustrates an example program 700 implemented by the example people meter 210 of FIGS. 2, 3, 4, and/or 5 to verify an audience composition of the media presentation environment. FIG. 8 illustrates an example program 800 implemented by the example people identification model controller 310 of FIGS. 3 and/or 5 to train the model to determine an audience composition of the media presentation environment.

Turning to FIG. 6, the example program 600 begins when the example media device 110 (FIG. 1) is on (block 602). For example, the audio sensor 120 (FIG. 1) may be activated and begin capturing audio data when the media device 110 is turned on, and thus the program 600 begins. The example media identifier 204 (FIG. 2) obtains samples of audio data from the example audio sensor 120 (block 604). For example, the audio sensor 120 captures samples of audio data corresponding to the media presentation environment 104 and the media identifier 204 generates one or more signatures based on the audio data.

The speech pattern determination controller 404 (FIG. 4) obtains one or more signatures from the media identifier 204 (block 606). For example, the audio database 402 obtains a signature via the interface 304 (FIG. 3) and the speech pattern determination controller 404 queries the audio database 402 for signatures corresponding to the media presentation environment 104.

The example speech pattern determination controller 404 applies filters to the signature(s) corresponding to the media presentation environment 104 (block 608). For example, the speech pattern determination controller 404 applies a low pass filter, a high pass filter, a bandpass filter, etc. to remove frequencies that are not associated with human voice (e.g., frequencies associated with animals, frequencies associated with cars, etc.). The filtered output is indicative of signature(s) of human voices detected during the filtering. In this manner, the example speech pattern determination controller 404 evaluates the filtered output (block 610). For example, the speech pattern determination controller 404 utilizes the information in the filtered output to predict and/or otherwise determine audience member identities.

The example speech pattern determination controller 404 determines if speech patterns were detected (block 612). For example, the speech pattern determination controller 404 utilizes the evaluation of the filtered output to determine if speech patterns were detected based on one or more characteristics (e.g., vocal tract length, vocal tract shape, pitch, speaking rate, etc.). If the example speech pattern determination controller 404 determines speech patterns were not detected (e.g., block 612=NO), then the example speech pattern determination controller 404 prompts the sampling controller 406 to sample the media environment (block 614). For example, the speech pattern determination controller 404 may send a trigger to the sampling controller 406 to prompt the sampling controller 406 to record additional samples of audio data of the media presentation environment 104.

If the example speech pattern determination controller 404 determines speech patterns were detected (e.g., block 612=YES), then the example speech pattern determination controller 404 provides the filtered output to the example speech pattern counter 408. The example speech pattern counter 408 determines the number of speech patterns in the filtered output (block 616). That is, the speech pattern counter 408 determines the people count of the audience. For example, the speech pattern counter 408 analyzes information in the filtered output to determine the number of speech patterns that were identified in the signatures. In some examples, the speech pattern counter 408 updates the counter with the number of speech patterns (e.g., the speech pattern counter 408 increments the counter to equal the number of speech patterns detected in the signatures).

The example speech pattern counter 408 provides the people count to the comparator 308 (FIG. 3) (block 618). For example, the speech pattern counter 408 is communicatively coupled to the comparator 308, and further provides the people count to the comparator 308 for a comparison to the prompted people count and/or the previously stored people count. The program 600 ends when the example speech pattern counter 408 provides the people count to the comparator 308. The program 600 repeats when the example sampling controller 406 (FIG. 4) initiates a new sample of audio data. For example, the sampling controller 406 may initiate the audio sensor 120 to record audio samples of the media presentation environment 104, and thus a new and/or same audience member identification, in the media presentation environment 104, may be detected.

Turning to FIG. 7, the example program 700 begins when the example comparator 308 (FIG. 3) obtains the people (block 702). For example, the comparator 308 obtains the people count from the audience audio detector 305 (FIG. 3) via the interface 304 (FIG. 3).

The example comparator 308 determines if the people count has changed (block 704). For example, the comparator 308 compares the people count to a previously stored people count determined at a previous sampling of the media presentation environment 104. In some examples, there is no previous sample of the media presentation environment 104 (e.g., the media device 110 was off). In such an example, the previously stored people count is zero. If the example comparator 308 detects no change in the people count (e.g., block 704=NO), the example comparator 308 determines a time of the comparison (block 712). If the example comparator 308 determines a change in people count (e.g., block 704=YES), the example speech pattern identifier 410 identifies one or more audience members associated with the identified speech patterns of the signatures (block 706). For example, the speech pattern identifier 410 compares the detected speech patterns to one or more reference speech patterns of audience members of the household.

The example speech pattern identifier 410 determines whether the number of identified audience members matches the number of detected speech patterns (block 708). For example, the speech pattern identifier 410 compares the number of identified audience members to the number of detected speech patterns. If the speech pattern identifier 410 determines the number of identified audience members does not match the number of detected speech patterns (e.g., block 708=NO), the example people meter controller 302 initiates a prompt to the audience (block 710). For example, the people meter controller 302 generates a prompting message. In this manner, the example people meter controller 302 generates the prompting message in an effort to obtain a response from the audience members to identify the unidentified humans represented by the signatures (e.g., the humans the example speech pattern identifier 410 did not identify) and generate accurate audience monitoring data.

If the example speech pattern identifier 410 determines the number of identified audience members matches the number of detected speech patterns (e.g., block 708=YES), the example speech pattern identifier 410 determines a time of the identification (block 712). For example, the speech pattern identifier 410 identifies the timestamp of when the match between the identified speech pattern and the reference speech pattern was determined. In some examples, the speech pattern identifier 410 identifies the timestamp of receiving the audience member identity in response to the prompt.

The example speech pattern determination controller 404 provides the audience composition (e.g., the people count, the audience members in the audience, etc.) and the time to the people identification model (block 714). For example, the speech pattern determination controller 404 outputs information determined from the comparison to train the people identification model. Further, the example audience audio detector 305 sends a reset notification to the example people meter controller 302 (block 716). For example, the audience audio detector 305 notifies the example people meter controller 302 to reset the scheduling interval timers that determine when prompting messages are to be triggered. In some examples, when the audience audio detector 305 provides the notification to the people meter controller 302, the example program 700 ends.

FIG. 8 illustrates an example training program 800 to train a people identification model to predict a verified audience composition for subsequent dates and times in the media presentation environment 104. The example machine readable instructions 800 may be used to implement the example people identification model controller 310 of FIG. 3. In FIG. 8, the example training program 800 beings at block 802, when the example feature extractor 504 (FIG. 5) obtains comparison data from the example comparator 308 (FIG. 3). For example, the comparator 308 provides comparison results and time stamps to the example feature extractor 504.

The example feature extractor 504 obtains data from the example people meter controller 302 (FIG. 3) (block 804). For example, the people meter controller 302 provides demographic data corresponding to the logged in audience member members at a time they logged in. The example feature extractor 504 obtains evaluation data from the example audience audio detector 305 (FIG. 3) (block 806). For example, the audience audio detector 305 provides the analysis and evaluation results (e.g., people identification data) of the signatures for a particular time. Additionally, the example audience audio detector 305 provides the tagged sample (e.g., the sample tagged with a people count by the speech pattern counter 408 (FIG. 4) and/or the audience member identifier by the speech pattern identifier 410 (FIG. 4)) to the example feature extractor 504.

The example feature extractor 504 obtains media identifying information from the example media measurement data controller 212 (FIG. 2) (block 808). For example, the media measurement data controller 212 provides media identifying information to the communication controller 502 (FIG. 5) in response to receiving a speech pattern count and/or panelist identifier(s), and the communication controller 502 provides the media identifying information to the feature extractor 504.

The example feature extractor 504 extracts features of the people monitoring information (block 810). As used herein, the people monitoring information corresponds to the information and data obtained from the example people meter controller 302, the example comparator 308, the example audience audio detector 305, and the example media measurement data controller 212. This data can be used to determine a verified audience composition and/or represents a verified audience composition.

The example feature extractor 504 generates a feature vector corresponding to the extracted features of the people monitoring data (block 812). For example, the feature extractor 504 generates a feature vector that represents descriptive characteristics of a physical environment (e.g., the media presentation environment) at particular dates and times, or at a particular date and time. The example feature extractor 504 determines if there are additional people monitoring data (block 814). For example, the feature extractor 504 determines if another set of people monitoring data, representative of the people count during a different time in the media presentation environment 104, is available. If the example feature extractor 504 determines there are additional people monitoring data (block 814=YES), then control returns to block 802. In such an example, the model trainer 506 (FIG. 5) needs to receive people monitoring data of the media presentation environment 104 that is sufficient to generate a sufficiently accurate and/or precise model.

If the example feature extractor 504 determines there are not additional people monitoring data (block 814=NO), then the example model trainer 506 trains the people identification model based on the feature vector (block 816). For example, the model trainer 506 may utilize a machine learning technique to predict output probability values corresponding to the number of people and/or which audience members are in the media presentation environment 104. The output probability values could correspond to future predictions of the audience members viewing particular media in the media presentation environment 104 or the output probability values could correspond to future predictions of the audience members in the media presentation environment 104 at a particular hour of the day or day of the week.

After the people identification model has been trained, the example model updater 508 flags the people identification model as new or updated. Further, the example model generator 510 generates the trained model (block 818). For example, the model generator 510 receives the new and/or updated trained people identification model from the model updater 508 and generates a file to store/save the trained people identification model for subsequent access by the people meter controller 302 (FIG. 3) and/or the audience audio detector 305 (FIG. 3).

The example model generator 510 stores the trained people identification model in the example model database 312 (FIG. 3) (block 820). The training program 800 ends when the trained people identification model is stored in the example model database 312. The training program 800 repeats when the example feature extractor 504 obtains people monitoring data.

In some examples, the trained people identification model is published by the people identification model controller 310. When the people identification model is published, the people identification model operates in a detection phase, where the example people identification model controller 310 utilizes the trained model, in real time, to determine an accurate audience composition of the media presentation environment 104. In some examples, the people identification model replaces the people meter controller 302, the audience audio detector 305, and the comparator 308. In such an example, the people identification model obtains input data from the audio sensor 120 to determine an accurate audience composition of the media presentation environment 104. Such input from the audio sensor 120 includes samples of audio data. For example, the people identification model utilizes its prediction capabilities in connection with information obtained about the media presentation environment 104 to output an accurate representation of the number and/or identification of people in the media presentation environment 104. In such an example, the people meter controller 302 no longer requires audience input, and thus compliance becomes less of an issue when determining an accurate audience composition.

Figure 9:
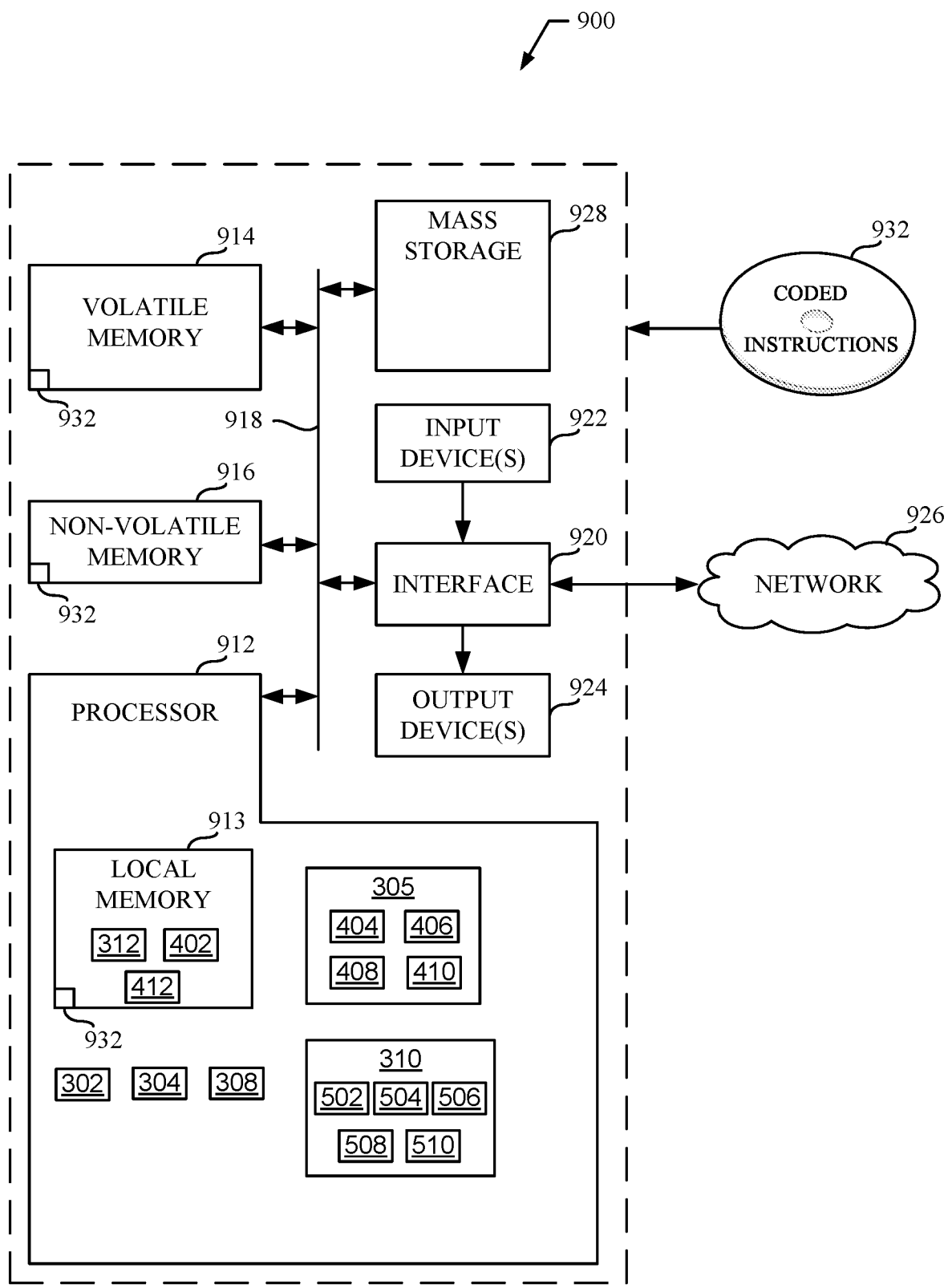
FIG. 9 illustrates a block diagram of an example processing platform structured to execute the instructions of one or more of FIGS. 6-8 to implement the example people meter of FIGS. 2-5.

FIG. 9 is a block diagram of an example processor platform 900 structured to execute the instructions of FIGS. 6-8 to implement the people meter 210 of FIGS. 2-5. The processor platform 900 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example people meter controller 302, the example interface 304, the example audience audio detector 305, the example comparator 308, the example people identification model controller 310, the example model database 312, the example audio database 402, the example speech pattern determination controller 404, the example sampling controller 406, the example speech pattern counter 408, the example speech pattern identifier 410, the example reference signature database 412, the example communication controller 502, the example feature extractor 504, the example model trainer 506, the example model updater 508, and the example model generator 510.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that determine an audience composition in a media presentation environment by generating signatures from audio data and comparing an evaluation of the signatures to audience input data. The disclosed example methods, apparatus and articles of manufacture improve the efficiency of using a computing device by using the audience input data and the evaluation of the signatures to train a people identification model to determine the audience composition. The people identification model, once trained, can replace the people meter and thus, improve the efficiency processing time by eliminating a need for audience input data. The disclosed example methods, apparatus and articles of manufacture improve the efficiency of using a computing device by reducing prompting messages when the speech patterns identified based on the signatures of audio data match the reference speech patterns of audience member audio. The disclosed methods, apparatus and articles of manufacture are accordingly directed to one or more improvement(s) in the functioning of a computer.

Example methods, apparatus, systems, and articles of manufacture to determine an audience composition in a media environment are disclosed herein. Further examples and combinations thereof include the following:

Example 1 includes an apparatus to measure an audience in a media environment, the apparatus comprising a controller to cause a people meter to emit a prompt for input of audience identification information at a first time, and determine a first audience count based on the input, an audio detector to determine a second audience count based on signatures generated from audio data captured in the media environment, and a comparator to cause the people meter to not emit the prompt for at least a first time period after the first time when the first audience count is equal to the second audience count.

Example 2 includes the apparatus of example 1, wherein the audio detector is to identify one or more audience members based on comparisons of the signatures of the audio data with a library of reference audience signatures.

Example 3 includes the apparatus of example 2, wherein the library of reference audience signatures includes sample signatures generated from speech associated with the one or more of the audience members.

Example 4 includes the apparatus of example 2, wherein the controller is to cause the people meter to emit the prompt when at least one of (i) the first audience count does not equal the second audience count, or (ii) the input audience identification information does not correspond to the one or more audience members identified based on the comparisons of the signatures of the audio data with a library of reference audience signatures.

Example 5 includes the apparatus of example 1, wherein the input is to include unique identifiers assigned to the audience.

Example 6 includes the apparatus of example 1, wherein the comparator is to send a reset notification to a counter, the people meter to emit the prompt when the counter expires.

Example 7 includes the apparatus of example 1, wherein the second audience count is based on a number of different speech patterns detected based on the signatures.

Example 8 includes a non-transitory computer readable storage medium comprising instructions that, when executed, cause one or more processors to at least cause a people meter to emit a prompt for input of audience identification information at a first time, determine a first audience count based on the input, determine a second audience count based on signatures generated from audio data captured in a media environment, cause the people meter to not emit the prompt for at least a first time period after the first time when the first audience count is equal to the second audience count.

Example 9 includes the non-transitory computer readable storage medium of example 8, wherein the instructions, when executed, cause the one or more processors to identify one or more audience members based on comparisons of the signatures of the audio data with a library of reference audience signatures.

Example 10 includes the non-transitory computer readable storage medium of example 9, wherein the library of reference audience signatures includes sample signatures generated from speech associated with the one or more of the audience members.

Example 11 includes the non-transitory computer readable storage medium of example 9, wherein the instructions, when executed, cause the one or more processors to cause the people meter to emit the prompt when at least one of (i) the first audience count does not equal the second audience count, or (ii) the input audience identification information does not correspond to the one or more audience members identified based on the comparisons of the signatures of the audio data with a library of reference audience signatures.

Example 12 includes the non-transitory computer readable storage medium of example 8, wherein the input is to include unique identifiers assigned to the audience.

Example 13 includes the non-transitory computer readable storage medium of example 8, wherein the instructions, when executed, cause the one or more processors to send a reset notification to a counter, the people meter to emit the prompt when the counter expires.

Example 14 includes the non-transitory computer readable storage medium of example 8, wherein the second audience count is based on a number of different speech patterns detected based on the signatures.

Example 15 includes a method to measure an audience in a media environment, the method comprising causing a people meter to emit a prompt for input of audience identification information at a first time, determining a first audience count based on the input, determining a second audience count based on signatures generated from audio data captured in the media environment, causing the people meter to not emit the prompt for at least a first time period after the first time when the first audience count is equal to the second audience count.

Example 16 includes the method of example 15, further including identifying one or more audience members based on comparisons of the signatures of the audio data with a library of reference audience signatures.

Example 17 includes the method of example 16, wherein the library of reference audience signatures includes sample signatures generated from speech associated with the one or more of the audience members.

Example 18 includes the method of example 16, further including causing the people meter to emit the prompt when at least one of (i) the first audience count does not equal the second audience count, or (ii) the input audience identification information does not correspond to the one or more audience members identified based on the comparisons of the signatures of the audio data with a library of reference audience signatures.

Example 19 includes the method of example 15, further including sending a reset notification to a counter, the people meter to emit the prompt when the counter expires.

Example 20 includes the method of example 15, wherein the second audience count is based on a number of different speech patterns detected based on the signatures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
   interface circuitry to obtain audio data;
   a processor; and
   a memory storing instructions that, when executed by the processor, cause the system to perform operations comprising:
      generating a target signature from the audio data, the target signature associated with a first time interval;
      comparing the target signature to a plurality of reference signatures in a library of reference signatures, the plurality of reference signatures associated with one or more identified audience members;
      in response to a determination that the target signature is not associated with a match in the library of reference signatures, causing a meter to emit a prompt for input of audience identification information associated with the first time interval;
      tagging the target signature generated from the audio data with metadata, wherein tagging the target signature comprises:
         combining audience metadata comprising the audience identification information with audio metadata comprising one or more characteristics of the audio data from which the target signature was generated to generate combined metadata for the target signature; and
         tagging the target signature with the combined metadata.

2. The system of claim 1, wherein the target signature is one of a plurality of target signatures associated with the first time interval, and wherein the operations further comprise:
determining a first people count associated with the first time interval based on comparison of the target signatures to the library of reference signatures; and
determining whether to cause the meter to emit the prompt for input of audience identification information based on the first people and a second people count associated with a second time interval prior to the first time interval.

3. The system of claim 2, wherein the operations further comprise:
causing the meter to emit the prompt for input of audience identification information in response to the first people count not matching the second people count; and
causing the meter to not emit the prompt for input of audience identification information in response to the first people count matching the second people count.

4. The system of claim 3, wherein the operations further comprise: notifying the meter to reset a timer for scheduling generation of prompts.

5. The system of claim 2, wherein the operations further comprise: determining the first people count based on a number of matches of the target signatures to different reference signatures associated with different ones of the identified audience members.

6. The system of claim 1, wherein the operations further comprise: initiating signature generation and comparison in response to a media device being turned on.

7. The system of claim 1, wherein the operations further comprise: performing signature generation and comparison in response to detection of a signal associated with control of a media device.

8. The system of claim 1, wherein the operations further comprise:
storing the target signature tagged with the combined metadata in a database.

9. The system of claim 1, wherein the audio metadata comprises metadata indicative of a device that captured the audio data.

10. A non-transitory computer readable storage medium comprising computer readable instructions that, when executed, cause a processor to perform operations comprising:
generating a target signature from audio data, the target signature associated with a first time interval;
comparing the target signature to a plurality of reference signatures in a library of reference signatures, the plurality of reference signatures associated with one or more identified audience members;
in response to a determination that the target signature is not associated with a match in the library of reference signatures, causing a meter to emit a prompt for input of audience identification information associated with the first time interval;
tagging the target signature generated from the audio data with metadata, wherein tagging the target signature comprises:
combining audience metadata comprising the audience identification information with audio metadata comprising one or more characteristics of the audio data from which the target signature was generated to generate combined metadata for the target signature; and
tagging the target signature with the combined metadata.

11. The non-transitory computer readable storage medium of claim 10, wherein the target signature is one of a plurality of target signatures associated with the first time interval, and wherein the operations further comprise:
determining a first people count associated with the first time interval based on comparison of the target signatures to the library of reference signatures; and
determining whether to cause the meter to emit the prompt for input of audience identification information based on the first people and a second people count associated with a second time interval prior to the first time interval.

12. The non-transitory computer readable storage medium of claim 11, wherein the operations further comprise:
causing the meter to emit the prompt for input of audience identification information in response to the first people count not matching the second people count; and
causing the meter to not emit the prompt for input of audience identification information in response to the first people count matching the second people count.

13. The non-transitory computer readable storage medium of claim 12, wherein to the operations further comprise: notifying the meter to reset a timer for scheduling generation of prompts.

14. The non-transitory computer readable storage medium of claim 11, wherein the operations further comprise: determining the first people count based on a number of matches of the target signatures to different reference signatures associated with different ones of the identified audience members.

15. The non-transitory computer readable storage medium of claim 10, wherein the operations further comprise: initiating signature generation and comparison in response to a media device being turned on.

16. The non-transitory computer readable storage medium of claim 10, wherein the operations further comprise: performing signature generation and comparison in response to detection of a signal associated with control of a media device.

17. A method comprising:
generating a target signature from audio data, the target signature associated with a first time interval;
comparing, by executing a first instruction with a processor, the target signature to a plurality of reference signatures in a library of reference signatures, the plurality of reference signatures associated with one or more identified audience members;
in response to a determination that the target signature is not associated with a match in the library of reference signatures, triggering, by executing a second instruction with the processor, a meter to emit a prompt for input of audience identification information associated with the first time interval;
assigning an audience member identifier to the audience identification information associated with the first time interval; and
tagging the target signature generated from the audio data with metadata, wherein tagging the target signature comprises:
combining audience metadata comprising the audience member identifier with audio metadata comprising one or more characteristics of the audio data from which the target signature was generated to generate combined metadata for the target signature; and
tagging the target signature with the combined metadata.

18. The method of claim 17, wherein the target signature is one of a plurality of target signatures associated with the first time interval, and wherein the method further comprises:
- determining a first people count associated with the first time interval based on comparison of the target signatures to the library of reference signatures; and
- determining whether to trigger the meter to emit the prompt for input of audience identification information based on the first people and a second people count associated with a second time interval prior to the first time interval.

19. The method of claim 18, further comprising:
- triggering the meter to emit the prompt for input of audience identification information in response to the first people count not matching the second people count; and
- causing the meter to not emit the prompt for input of audience identification information in response to the first people count matching the second people count.

20. The method of claim 19, wherein the causing of the meter to not emit the prompt comprises: notifying the meter to reset a timer for scheduling generation of prompts.

* * * * *